United States Patent
Bozorgi et al.

(10) Patent No.: US 12,218,347 B2
(45) Date of Patent: Feb. 4, 2025

(54) MEMS ANODE BATTERY

(71) Applicant: PiMEMS, Inc., Pleasanton, CA (US)

(72) Inventors: Payam Bozorgi, Santa Barabara, IN (US); Shannon Gott, Santa Barabara, CA (US)

(73) Assignee: PiMEMS, Inc., Pleasanton, CA (US)

( * ) Notice: Subject to any disclaimer, the term of this patent is extended or adjusted under 35 U.S.C. 154(b) by 903 days.

(21) Appl. No.: 17/415,145

(22) PCT Filed: Dec. 17, 2019

(86) PCT No.: PCT/US2019/066938
§ 371 (c)(1),
(2) Date: Jun. 17, 2021

(87) PCT Pub. No.: WO2020/154053
PCT Pub. Date: Jul. 30, 2020

(65) Prior Publication Data
US 2022/0059829 A1    Feb. 24, 2022

Related U.S. Application Data

(60) Provisional application No. 62/782,367, filed on Dec. 20, 2018.

(51) Int. Cl.
*H01M 4/485*   (2010.01)
*H01M 4/04*    (2006.01)
(Continued)

(52) U.S. Cl.
CPC ......... *H01M 4/485* (2013.01); *H01M 4/0402* (2013.01); *H01M 4/366* (2013.01); *H01M 10/058* (2013.01); *H01M 2004/021* (2013.01)

(58) Field of Classification Search
CPC .... H01M 4/485; H01M 4/0402; H01M 4/366; H01M 10/058; H01M 2004/021;
(Continued)

(56) References Cited

U.S. PATENT DOCUMENTS

2006/0093873 A1    5/2006  Howard et al.
2010/0040951 A1*   2/2010  Yamamoto ............ H01M 4/134
                                                         429/231.95
(Continued)

FOREIGN PATENT DOCUMENTS

WO    20060093873    7/2018

OTHER PUBLICATIONS

Mikhaylik, et. "High Energy Rechargeable Li—S Cells for EV Application, Status, Remaining Problems and Solutions" ECS Transactions, vol. 25, 216th ECS Meeting, Oct. 4-9, 2009, Vienna, Austria, No. 35. published: Apr. 16, 2010; entire documents, especially p. 1 [online] <https.//iopscience.iop.org/article/10.1149/1.3414001/mets>.

(Continued)

*Primary Examiner* — Abdullah A Riyami
*Assistant Examiner* — Nader J Alhawamdeh
(74) *Attorney, Agent, or Firm* — BOTKIN & HALL, LLP; Michael D. Marston

(57) ABSTRACT

The present application discloses a microfabricated micronscale battery having excellent performance attributes. The battery using a titanium anode which is etched to form a plurality of raised features on the titanium anode. The raised features are coated conformally with a highly conductive metal. A layer of titanium is then formed over the highly conductive metal. This titanium layer is then oxidized to provide further small scale roughness. The roughness increases the surface area which improves the uptake of lithium ions by the anode. The battery can be combined with a titanium thermal ground plane to further enhance performance by removing heat from the battery.

3 Claims, 30 Drawing Sheets

(51) Int. Cl.
*H01M 4/36* (2006.01)
*H01M 10/058* (2010.01)
*H01M 4/02* (2006.01)

(58) Field of Classification Search
CPC ...... H01M 4/1391; H01M 4/38; H01M 4/483;
H01M 4/134; H01M 10/0525; H01M
4/0423; H01M 4/131; H01M 2220/30;
H01M 2300/0037; Y02E 60/10; Y02P
70/50; B81B 1/00; B81B 2201/058; B81C
1/00111
See application file for complete search history.

(56) References Cited

U.S. PATENT DOCUMENTS

| | | | |
|---|---|---|---|
| 2013/0164611 A1* | 6/2013 | Nanba | H01M 4/70 429/211 |
| 2014/0030559 A1* | 1/2014 | Yazami | H01M 4/5835 429/332 |
| 2014/0072720 A1* | 3/2014 | Watkins | G02B 1/118 252/521.1 |
| 2017/0338167 A1 | 11/2017 | Bozorgi | |
| 2022/0059829 A1* | 2/2022 | Bozorgi | H01M 4/0402 |

OTHER PUBLICATIONS

Hoang "Defect Physics, Delithiation Mechanism, and Electronic and Ionic Conduction on Layered Lithium Manganese Oxide Cathode Materials" Phys. Rev. Applied 3, 024013. Feb. 24, 2015; entire document; especially abstract; [online] <https://journals.aps.org/prapplied/abstract/10.1103/PhysRevApplied.3.024013>.

* cited by examiner

PiMEMS vs SoA Microbatteries

| Metrics | PiMEMS Battery | SoA Micro-batteries |
|---|---|---|
| Anode Material | TiO$_2$ Alloy based | Si based |
| Total Package thickness | 300~400 μm | 600~1000 μm |
| Estimated Energy/Volume | 1200~1500 Wh/L | 800 ~ 1000 (Wh/L) [1] |
| Estimated Energy / Weight | 400~430 Wh/kg | 325 ~ 400 (Wh/kg) [2] |
| Flexible | Yes | NO |
| Conformal-2D or 3D form Factor | Yes | NO |
| Thermal Solution | Embedded (TiTGP) | No Embedded |

Fig. 9

| Metric | Estimated Performance | Required Metrics |
|---|---|---|
| Height | < 10 mm | < 10 mm |
| Total Battery Weight | 0.640 g | 1 g |
| Total Number of Cell Units in one Packaged Battery | 33 | --- |
| Cathode Material | $Li_2MnO_3 - LiMO_2$ | --- |
| Cathode Mid-Point Discharged Voltage | 3.6 v | --- |
| $TiO_2$ Mid-Point Discharged Voltage | 1.75 V | --- |
| $TiO_2$ Max Capacity | 330 Ah/kg | --- |
| Specific Energy Density | 610 W-hr/kg | 500 W-hr/kg |
| Volumetric Energy Density | 2,745 W-hr/L | 1500 W-hr/L |
| Delivered Power | 250 mW | 200 mW |
| Duration of Power | > 2.5 h | > 2.5 h |

Fig. 11

Evaporator Region

Condenser Region

Evaporator Region

MEMS ANODE BATTERY

CROSS REFERENCE TO RELATED APPLICATIONS

This is the U.S. National Stage of International Application No. PCT/US2019/066938 filed on Dec. 17, 2019 which claims priority to U.S. Provisional Application Ser. No. 62/782,367, filed Dec. 20, 2018. The prior applications are incorporated by reference in their entirety.

STATEMENT REGARDING FEDERALLY SPONSORED RESEARCH

Not applicable.

STATEMENT REGARDING MICROFICHE APPENDIX

Not applicable.

BACKGROUND

This invention relates to battery technology.

With currently available power sources, users have had to choose between power and energy. For applications that need a lot of power, like broadcasting a radio signal over a long distance, capacitors can release energy very quickly but can only store a small amount. For applications that need a lot of energy, like playing a radio for a long time, fuel cells and batteries can hold a lot of energy but release it or recharge slowly.

Lithium-ion batteries (abbreviated as LiBs) are common batteries for portable electronics, with a high energy density, tiny memory effect and low self-discharge. Now ubiquitous, the lithium ion battery is rechargeable, and is a battery in which lithium ions move from the negative electrode to the positive electrode during discharge and back when charging. Li-ion batteries use an intercalated lithium compound as one electrode material, compared to the metallic lithium used in a non-rechargeable lithium battery. LIBs are also growing in popularity for military, battery electric vehicle and aerospace applications.

The most commercially popular negative electrode for LiBs is graphite. The positive electrode is generally one of three materials: a layered oxide (such as lithium cobalt oxide), a polyanion (such as lithium iron phosphate) or a spinel (such as lithium manganese oxide). Recently, graphene based electrodes (based on 2D and 3D structures of graphene) have also been used as electrodes for lithium batteries. The electrolyte is typically a mixture of organic carbonates such as ethylene carbonate or diethyl carbonate containing complexes of lithium ions. More recently, silicon has been investigated as an anode material because of its large theoretical specific capacity, however silicon has some unattractive mechanical properties.

Chemistry, performance, cost and safety characteristics vary across LIB types. Handheld electronics mostly use LIBs based on lithium cobalt oxide which offers high energy density but presents safety risks, especially when damaged.

Indeed, lithium-ion batteries can be a safety hazard since they contain a flammable electrolyte and may be kept pressurized. Pure lithium is highly reactive, reacting vigorously with water to form lithium hydroxide (LiOH) and hydrogen gas. Thus, a non-aqueous electrolyte is typically used, and a sealed container rigidly excludes moisture from the battery pack. If a LiB is charged too quickly, is crushed, or if it is subjected to a higher electrical load than it can safely handle, an external short circuit can trigger the batteries to explode or start a fire.

Finally, LiBs are more expensive than NiCd batteries but operate over a wider temperature range with higher energy densities. They require a protective circuit to limit peak voltage.

Accordingly, commercially available lithium ion batteries (LIB) have a number of safety, cost and reliability issues. Graphite anode LIBs struggle with overcharging, overheating, and short circuiting. Silicon-based anode LIBs suffer from large volume change during the charge and discharge process, leading to ultimate destruction of the silicon and subsequent side reactions.

SUMMARY

The present application discloses a high performance, improved battery especially for applications where weight is an important consideration. The battery displays exceptional performance, has increased storage capacity, decreased charging time, better safety performance and smaller form factor.

An object of this invention is to provide an architecture for a small form factor battery which has improved performance relative to lithium ion batteries.

Another object of this invention is to provide an architecture for a small form factor battery which has extreme safety attributes over lithium ion batteries.

Another object of this invention is to provide an architecture for a small form factor battery which has improved recharging performance over lithium ion batteries.

Another object of this invention is to provide an architecture for a small form factor battery which is less expensive, smaller and lighter weight than lithium ion batteries.

Another object of this invention is to provide an architecture for a small form factor battery which has a higher voltage discharge plateau capacity than lithium ion batteries.

Another object of this invention is to provide an architecture for a small form factor battery which is environmentally friendly compared to lithium ion batteries.

Another object of this invention is to provide an architecture for a small form factor battery which has excellent cycling stability and thus a longer lifetime than lithium ion batteries.

In the architecture described here, titanium-based material is substituted for the graphite or graphene. In particular, titanium oxide ($TiO_2$) is used in place of the carbon. $TiO_2$ inherently has a higher lithium insertion potential than graphite, and does not produce hydrogen gas, thus circumventing the above issues. MEMS-based fabrication techniques are brought to bear on the morphology of the anode.

The architecture proposed here replaces the graphite anode with a titanium-based material. Titanium-based anode LIBs can circumvent the above safety and reliability problems, but have relatively low specific energy capacity and low electrical conductivity. Titanium alloys, and in particular the oxide $TiO_2$, for example, have inherently higher lithium insertion potential than graphite, and an array of other desirable performance attributes.

The focus of this architecture is on the LIB anode, as it largely controls the energy and power density and is a major player in thermal stability. Given that the majority of lithium ions in $TiO_2$ have been detected within 10 nm of the surface, and larger charge/discharge capacities are driven by those lithium ions within a few nm of the surface, increasing the anode surface area can have a significant impact on the energy density.

In order to harness the benefits of a high surface area anode with the safety and reliability of titanium, the architecture described here uses MEMS fabrication techniques, to provide three dimensional (3D) surface area contours, referred to herein as "raised features" which protrude, or stand proud of a surrounding surface. The 3D titanium MEMS raised features may be in the form of nanostructured pillars, providing an increase of surface area on the order of 150 compared to planar anodes. This in turn provides more lithium ion insertion sites close to the surface, decreasing the internal resistance, and increasing the energy and power density.

The architecture described here also addresses the electrical resistance problem common to titanium-based anodes through the addition of an integrated conductive network. A low resistivity metal coating is disposed conformally over the 3D anode surface.

Accordingly, the battery makes use of microfabricated electrodes or terminals. The electrodes or terminals may comprise titanium, and may have a microroughness that far exceeds standard electrode morphology. As a result of this roughness, the surface area of the terminal is much larger than a standard terminal or electrode. The Ti anode may display low volume change during Li ion insertion/desertion (<4%). The Ti anode may also have excellent structural and chemical stability.

Another problem previously associated with Ti anodes is low electrical conductivity. This disadvantage is addressed by depositing a thin layer of a highly conductive metal over top of the ti-based high surface area contour. The highly conductive metal layer may enhance the otherwise rather poor conductivity of the $TiO_2$ material.

This metal layer can then be covered with another ti-based film, which is roughened on a nm scale. In the microroughening procedure, this outer layer of $TiO_2$ may have small scale topography that may increase the surface area to about 150× what is available on a planar graphite anode. In this way, a highly-conductive gold network (i.e. the thin layer of low resistivity/high conductivity metal) is provided, which is integrated with the NST pillars to support $Li^+$ ion transport and decrease resistance of the electron ($e^-$) pathway. This allows a higher insertion rate anode. Accordingly, this architecture also addresses the electrical resistance common to titanium-based anodes through the addition of an integrated conductive network. These two features may be used to significantly improve power density.

Accordingly, a battery is described which may include a metal anode comprising a plurality of microfabricated raised features, wherein the microfabricated raised features may have an aspect ratio height/diameter of at least 1 and a pitch of between 1 and 50 microns. The battery may further include a metal coating of a second metal that is conformal to the metal anode and the microfabricated raised features, and a metal oxide layer over the metal coating, wherein the metal oxide layer has a microfabricated microroughness of at least 1 nm rms. In some embodiments, the metal anode may be a titanium metal anode, and the metal oxide may be $TiO_2$.

BRIEF DESCRIPTION OF THE DRAWINGS

Various exemplary details are described with reference to the following figures, wherein:

FIG. 9 shows a comparison of the Ti MEMS-based anode battery to SoA micro-batteries;

FIG. 11 illustrates the inventive LiTi coupled to a TiTGP; and

It should be understood that the drawings are not necessarily to scale, and that like numbers may refer to like features.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
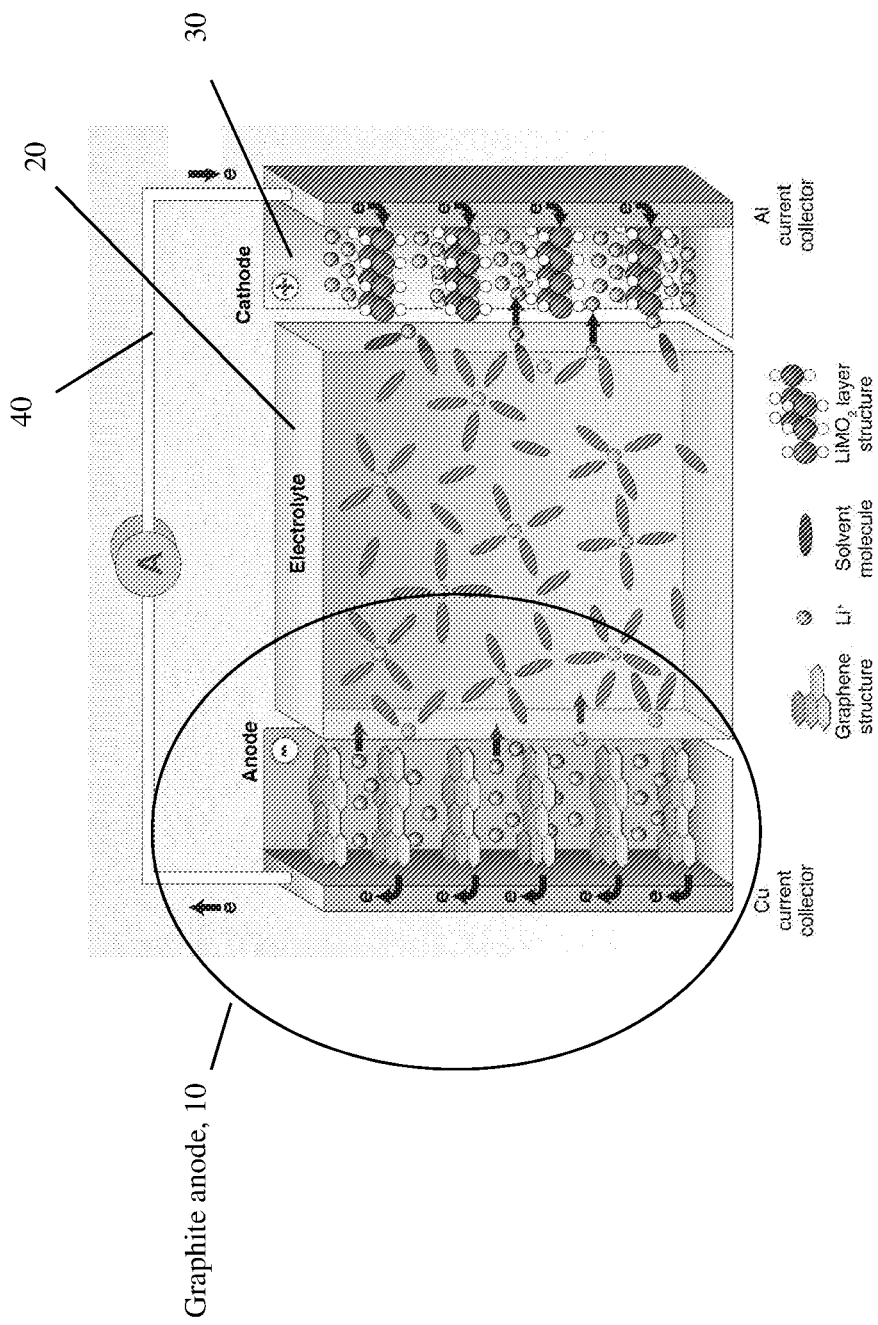
FIG. 1 illustrates a lithium ion battery according to present day practice.

FIG. 1 illustrates a lithium ion battery according to present day practice. The reactants in the electrochemical reactions in a lithium-ion battery are the negative 10 and positive 30 electrodes and the electrolyte 20 providing a conductive medium for lithium ions to move between the electrodes. Electrical energy flows out from or in to the battery when electrons flow through an external circuit during discharge or charge, respectively. Both electrodes 10, 30 allow lithium ions to move in and out of their structures with a process called insertion (intercalation) or extraction (deintercalation), respectively.

During discharge, the positive lithium ions move from the negative electrode 10 (anode) (previously graphite) to the positive electrode 30 (cathode) forming a lithium compound through the electrolyte. Accordingly, the electrons flow through the external circuit 40 in the same direction. When the cell is charging, the reverse occurs with the lithium ions and electrons move back into the negative electrode in a net higher energy state. The lithium compound may be lithium manganese dioxide ($LiMnO_2$) or lithium cobalt dioxide ($LiCoO_2$) for example.

In a lithium-ion battery, the lithium ions are transported to and from the positive 30 or negative 10 electrodes by oxidizing the transition metal, cobalt (Co), or manganese (Mn) for example. The overall reaction has its limits. During lithium ion battery charging, lithium ions migrate from the cathode to embed themselves in the anode. As the graphite anode fills with lithium, the voltage drops and can enter into an unsafe voltage range. This is termed overcharge. Overcharge can result in lithium deposition on the anode surface, leading to short circuit, or breakdown of solid electrolyte interphase (SEI), leading to overheating.

Lithium-ion batteries can be a safety hazard since they contain a flammable electrolyte and may be kept pressurized. Pure lithium is highly reactive, reacting vigorously with water to form lithium hydroxide (LiOH) and hydrogen gas. Thus, a non-aqueous electrolyte is typically used, and a sealed container rigidly excludes moisture from the battery pack. If a LiB is charged too quickly, is crushed, or if it is subjected to a higher electrical load than it can safely handle, an external short circuit can trigger the batteries to explode or start a fire.

The most commercially popular negative electrode is graphite. However, graphite is susceptible to overcharge. In addition, lithium deposition on anode surface (leads to short circuit) or breakdown of solid electrolyte interphase (SEI) (leads to overheating) due to low voltage. The graphite anode is therefore the source of much of the hazard associated with LiBs.

In the architecture described here, titanium-based material is substituted for the graphite or graphene. In particularly, titanium oxide ($TiO_2$) is used in place of the carbon. $TiO_2$ inherently has a higher lithium insertion potential than graphite, and does not produce hydrogen gas, thus circumventing the above issues. MEMS-based fabrication techniques are brought to bear on the morphology of the anode.

A battery is described which may include a metal anode comprising a plurality of microfabricated raised features, wherein the microfabricated raised features have an aspect ratio of about 10 and a pitch of about 10 microns, a high conductivity metal coating that is conformal to the metal anode and the microfabricated raised features, and a metal oxide layer over the high conductivity metal coating, wherein the metal oxide has a roughness on the nm scale. In some embodiments, the metal anode may be a titanium metal anode, and the metal oxide may be $TiO_2$. However, this embodiment is exemplary only, and it should be understood that a wide variety of metals may be used for this purpose, including aluminum (Al), Copper (Cu) and stainless steel. The outer microroughened oxide coating may be an oxide of the same metal as the metal anode, or it may be a different compound. The "high conductivity" metal coating should be understood to mean a metal coating with a resistivity (reciprocal of conductivity) of less than 1.0 ohm-meters. The term "microfabricated microroughness" is used herein to refer to the roughness produced on the metal oxide layer, which is on the scale of between about 0.1 to about 1000 nm. As is usual, the term "micrometers" is used interchangeably with "microns" or "μm" to refer to a dimension of $10^{-6}$ meters. The term "nanometers" or "nm" refers to a dimension of $10^{-9}$ meters. Accordingly, "nano-structures" may have characteristic dimensions on the order of less than 1000 nm or 1 micron.

In the discussion to follow, the titanium based battery may be referred to as a "MEMS Ti Battery" or a "3D MEMS battery" or a "TiLi" battery. These terms should be understood to be synonymous, and refer to the novel battery architecture described below, which uses a titanium-based anode with a conductive metal underlayer and Ti oxide overcoat which has a micro roughness on its surface to increase surface area. The term "Ti-based anode" should be understood to mean an anode comprising a preponderance of titanium, or titanium alloyed with another element. The Ti alloys may include aluminum, vanadium, carbon, nitrogen, oxygen, hydrogen, iron or ytterbium. This list is exemplary only, and is not intended to be an exhaustive list of all of the titanium alloy options.

As mentioned previously, energy density can be improved by a large active surface area that allows for efficient use of all the anode material. To achieve higher surface area of the anode, a typical planar anode structure in current LIB technologies may be replaced with 3D Ti micropillar structures that are coated with gold and Nano-Structured-Titania (NST). Micropillars are shapes that are readily created using the lithographic techniques described below. However this shape is exemplary only, and many other shapes may also be used to increase the surface area. These protruding shapes may be referred to more generally as "raised features".

Micropillar structures can be created from bulk titanium foils by using semiconductor lithographic techniques (SUSS MA-6) coupled with a plasma dry etching methods on a Panasonic E640 system. This method is exemplary only, and other methods for imparting a topology may exist, for example, deep reactive ion etching through a mask. For a given pillar structure with diameter of 1 µm and height of 10 µm and spacing of 2 µm, the anode surface area can be increased by a factor of 4.5. More generally, however, the micropillars may have a diameter of less than 10 microns, and a height of at least 10 microns. Accordingly the features may have an aspect ratio (height to diameter) of at least 1 and more preferably at least 10. It should be understood that this aspect ratio of the raised features (of at least 1) is different from the "effective aspect ratio" of the channels formed in the wicking structure by the fitting of the intermediate substrate into the metal backplane, as discussed below especially with respect to FIG. 16. If the microroughness features do not have a regular shape, such as a pillar or column, the aspect ratio may be defined with respect to a characteristic (mean or average or root-mean-square) height relative to a characteristic (mean or average or rms) diameter. The "pitch" between the features may be understood as the center-to-center spacing of the features. microroughness features do not have a regular spacing, such as may be formed lithographically through a mask, the pitch may be defined with respect to a characteristic (mean or average or root-mean-square) pitch. Detailed descriptions of techniques for forming the micropillars are discussed further below, with respect to a titanium thermal module or titanium thermal ground plane (TiTGP).

On each pillar, a thin layer of a second metal, for example gold (Au), may be deposited via physical vapor deposition (Temescal E-Beam), for example, forming a conductive network for facile transport of electrons. On the gold layer is deposited (Temescal E-Beam) another thin layer of $TiO_2$, which is used to grow NST. Heated hydrogen peroxide reacts with $TiO_2$ to form the complex nanostructures in the $TiO_2$, that is, to form the nanostructured titanium (NST). The process may be optimized to maximize the surface area of the NST as the NST acts to increase the interfacial electrochemical reactions and flux of ions across the electrode-electrolyte interface, facilitating charge transport efficiency and enhancing the capacity.

As the NST facilitates the transport and storage of lithium ions, the gold layer creates ease of movement for their electron counterpart. The storage of lithium in the electrodes is negatively impacted by low conductivities, and because of this electrical resistance, some electrons from the lithium ions fail to be delivered to the external circuit. Therefore, the power of the battery depends strongly on the internal impendence, as they are inversely related. The gold layer intimately adjacent to the NST provides a pathway for the electrons that overcomes the otherwise low conductivity of the titanium.

Some problems previously associated with Ti anodes were low specific capacity (charge/mass). Graphite has a specific capacity of 372 mAh/g. Carbon nano-fibers (CNFs) 450 mAh/g; whereas $TiO_2$ is only at 330 mAh/g. However, this performance attribute can be greatly improved by increasing the surface area of the Ti-based anode. MEMS techniques may be used to significantly increase the surface area by microfabricating thousands of raised features (here, 3D micro pillars with nano-structured titania). This enhances $Li^+$ ion charge transport efficiency by promoting interfacial electrochemical reactions and higher flux of Li-ions across the electrode—electrolyte interface—anode between the $TiO_2$ anode and cathode. The 3D titanium MEMS in the form of nanostructured pillars, may provide an increase of surface area on the order of 150 compared to planar anodes. This translates to more lithium ion insertion sites close to the surface, decreasing the internal resistance, and increasing the energy and power density.

Figure 2:
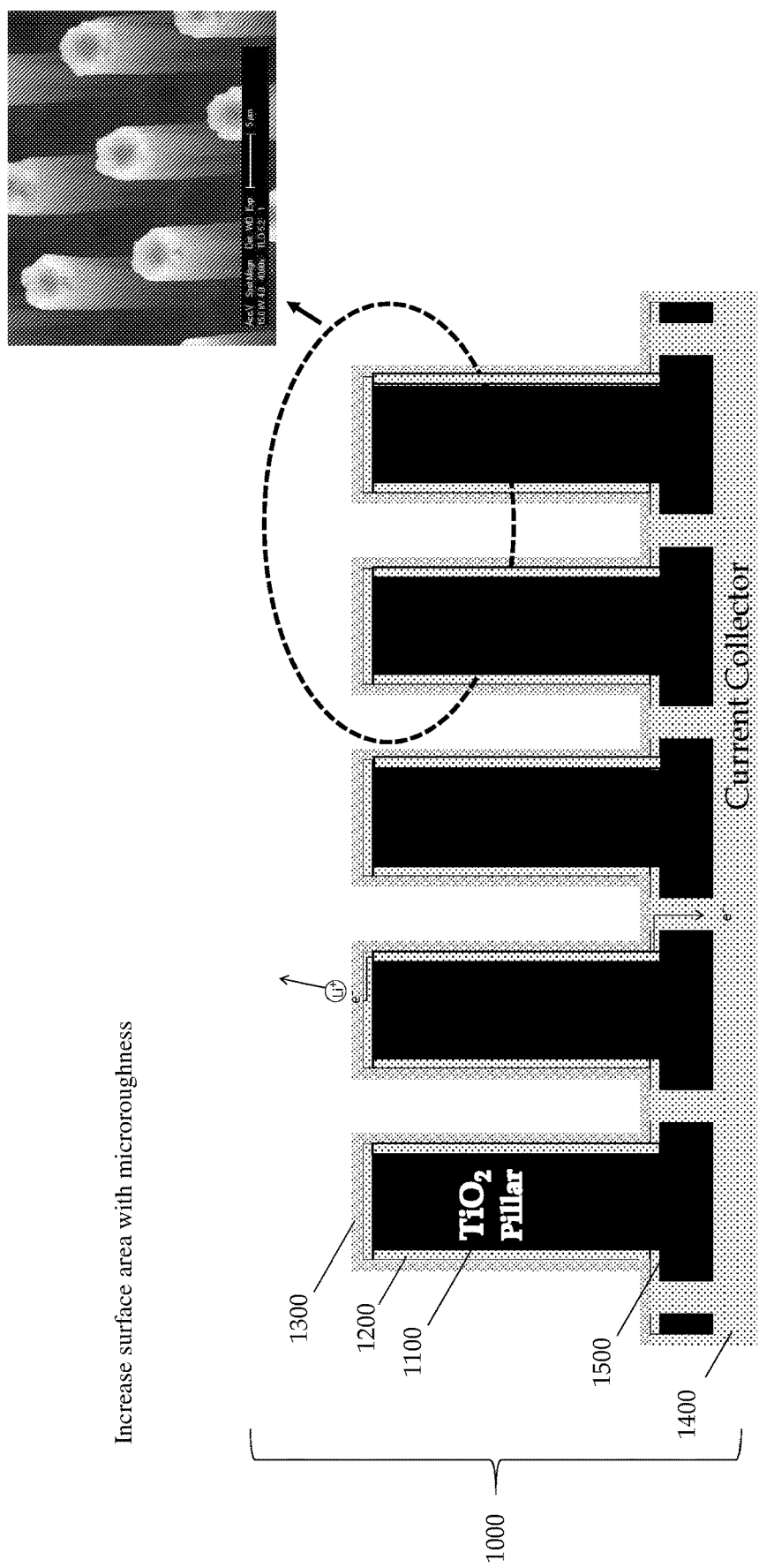
FIG. 2 illustrates a microfabricated Ti MEMS-based anode.

FIG. 2 illustrates a microfabricated Ti MEMS-based anode, according to the systems and methods described briefly above. As shown in FIG. 2, a surface of the Ti material 1500 is micromachined to have a plurality of raised features 1100. These features may be protuberances which are raised with respect to another surface of the Ti material 1500, i.e. these raised features may stand "proud" with respect to an adjacent surface. In one embodiment, the raised features are an array of pillars having a generally circular cross section, and raised with respect to a lower surface. The pillars 1100 may be formed by etching of the titanium using a mask to protect the areas corresponding to the pillars, from the etchant.

This process may leave raised features proud of the surrounding material etched in the process. The pillars may have a diameter of about 1-8 microns and more preferably about 5 microns, and may stand 10-50 microns and more preferably 20 microns proud of the remaining surface. There may be a pitch of about 10 microns between the pillars. Accordingly, the raised features may have an aspect ratio (height to diameter) of at least about 1, and more preferably about 10. Detailed description of techniques for forming the micropillars are discussed further below, with respect to a titanium thermal module or titanium thermal ground plane (TiTGP).

The pillars 1100 may be covered with a layer of a highly conductive material 1200. In some embodiments, this material may be gold. But other conductive materials such as silver, copper, platinum or aluminum may also be used. This conformal conductive coating 1200 may be deposited by sputtering or vapor deposition, for example. The thickness of the material may need only be sufficient for good conductivity. In some embodiments, 5-10 microns is a sufficiently thick layer 1200.

The conductive layer 1200 may finally be covered with another layer of an oxidizable metal, for example, titanium Ti. Titanium can be oxidized to form Nano Structured Titania (NST), 1300, which forms stable and super hydrophilic surfaces. In some embodiments, titanium (Ti) substrates with integrated Nano Structured Titania (NST) have been found suitable for use in the TiLi battery.

Metals, such as but not limited to titanium, aluminum, copper, or stainless steel, can be microfabricated with controlled characteristic dimensions (depth, width, and spacing) ranging from about 1-1000 micrometers, to engineer the topography of the anode surface. In some embodiments, the controlled characteristic dimensions (depth, width, and spacing) could range from 10-500 micrometers, to engineer the topography of the anode surface for optimal performance and customized for specific applications.

In some embodiments, titanium can be oxidized to form nanostructured titania (NST), 1300, which could provide a micro roughened surface, to dramatically increase the surface area available for lithium ion insertion. The NST can be comprised of hair-like patterns with a nominal roughness of 200 nanometers (nm). In some embodiments, NST can have a nominal roughness of 1-1000 nm.

Finally, the conductive layer 1200 is in electrical communication with a current collector 1400, which collects the current from each of the conductor-covered 1200 raised features 1100. Together these features 1100, 1200, 1300 and 1500 comprised the micro machined titanium anode 1000.

Figure 3:
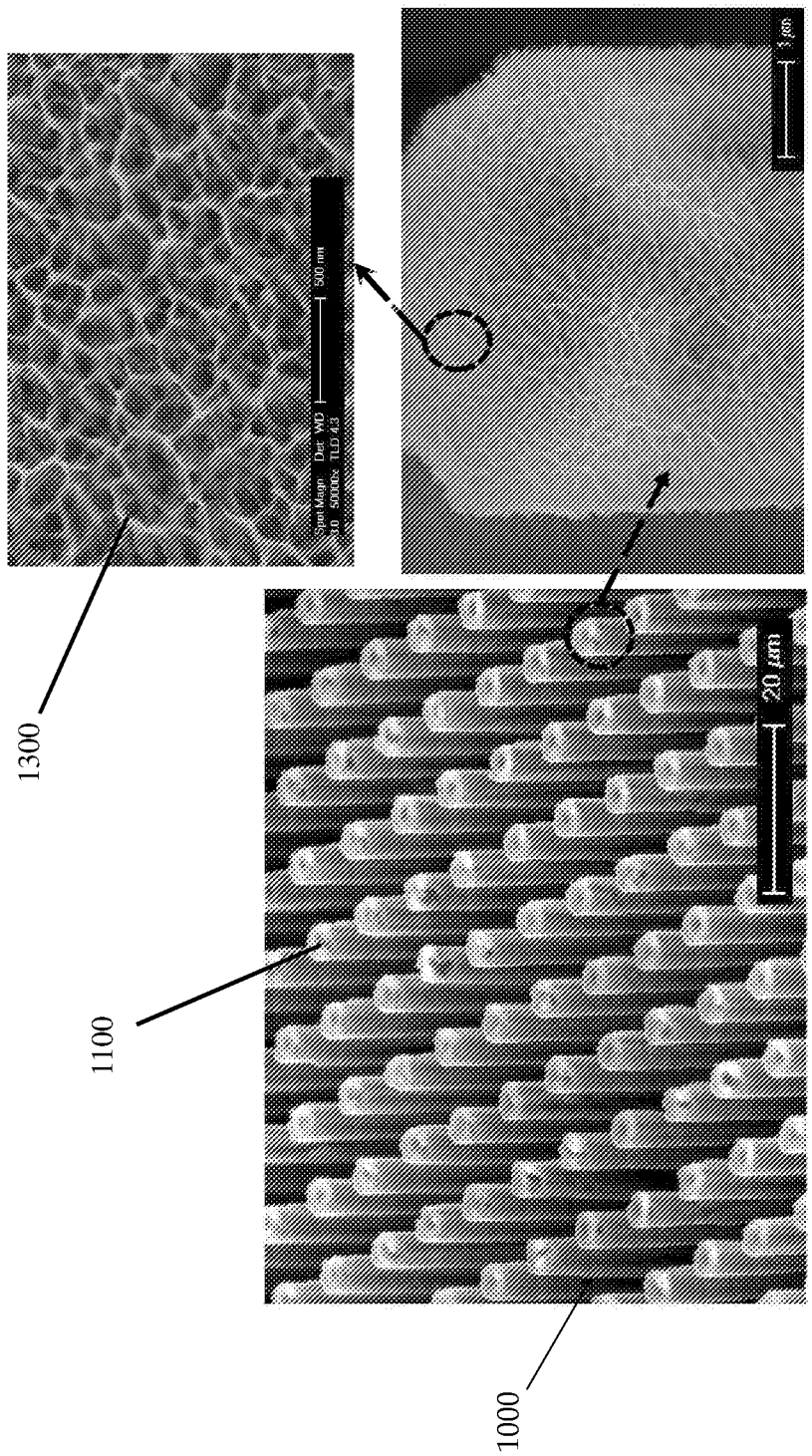
FIG. 3 illustrates a microfabricated Ti MEMS-based anode concept with scanning electron microscope images of pillars and NST.

FIG. 3 illustrates a microfabricated Ti MEMS-based anode 1000 concept with scanning electron microscope images of pillars and NST. The SEM images show the staged roughening of the surface from the etched raised features 1100, with the conformal coating of Ti which is then oxidized to form $TiO_2$ and with the NST microroughness 1300. The dimensions of the features are shown, from the 5 micron diameter raised features to the approximately 200 nm NST roughness. The overall titanium anode structure 1000 may have a thickness as little as 50 μm.

NST can be created in titanium by oxidation to form nanostructured titania (NST), which could provide greatly increases surface area because of its small scale roughness. In some embodiments, the NST can be comprised of hair-like patterns with a nominal roughness of 200 nanometers (nm). In some embodiments, NST can have a nominal roughness of 1-1000 nm. Detailed description of techniques for creating NST are discussed further below, with respect to a titanium thermal module or titanium thermal ground plane (TiTGP).

Figure 4:
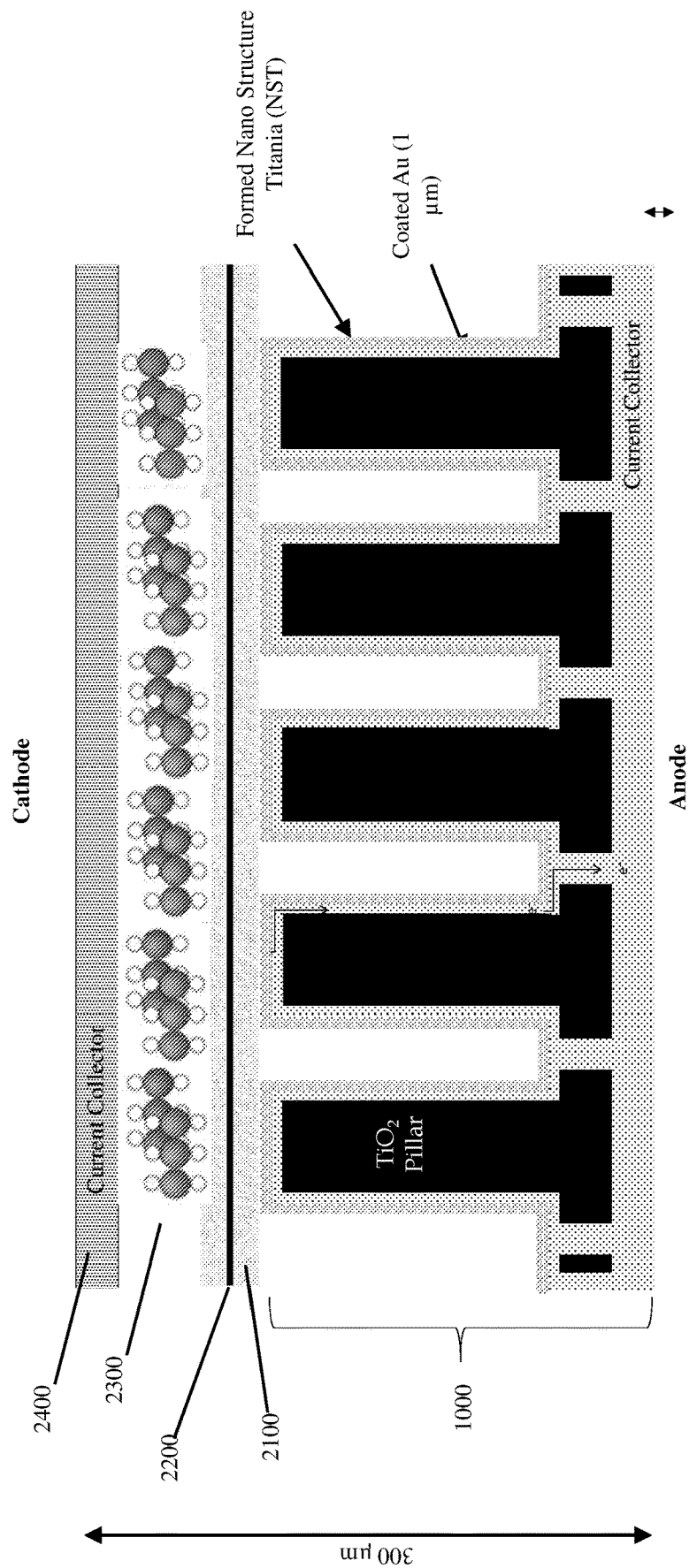
FIG. 4 is a simplified diagram illustrating a TiMEMS battery architecture.

FIG. 4 is a simplified diagram illustrating a TiMEMS battery architecture that encloses the micromachined surfaces of the titanium anode 1000. In addition to the micromachined surfaces of the titanium anode 1000, there may be an electrolyte 2100, a separator 2200 and a layered Lithium-transition metal-oxide material 2300. The layered cathode structure may comprise thin layers of $Li_2MnO_3^+/LiMnO_2$. Alternatively, $LiMO_2$ materials (M=Mn, Fe, and Co) may be used. A current collector 2400 may be disposed behind the layered lithium structure, which collects the current from the cathode. The electrolyte may be, for example, 1 M $LiPF_6$ in 50/50 mix of ethylene carbonate & diethyl carbonate.

In other embodiments, the electrolyte may be a solid electrolyte. Solid electrolytes conduct lithium ions at room temperature and can potentially replace conventional organic electrolytes, which are flammable and toxic. Sulfide compounds with high Li-ion conductivity are not commonly available, and as such, the development of solid state electrolyte-based Li-ion batteries has been plagued by the lack of widespread availability of these difficult-to-produce materials. However, presently advanced materials are being used to develop a process for producing sulfide materials in a form that potentially allows them to be used in Li-ion cells. For example, a solid electrolyte material—lithium tin phosphorous sulfide ($Li_{10}SnP_2S$)—along with various oxide and non-oxide solid electrolyte material compositions (e.g., sulfide-based), as well as a polymer-ceramic composite electrolyte and a PEO-based polymer solid electrolyte may be used.

Accordingly, the titanium MEMS-based anode LIB assembly is shown in FIG. 4. The titanium MEMS-based anode 1000 is used with an electrolyte 2100, separator 2200, and $Li_2MnO_3$-$LiMO_2$ layered structure 2300 and cathode 2400 for a total thickness of 300 μm. Because of the exceedingly thin form factor, a 10 mm thick battery may comprise up to 33 of these cell units stacked up inside one package. The topology of the titanium anode 1000 may be as previously discussed with respect to FIGS. 2 and 3.

Figure 5:
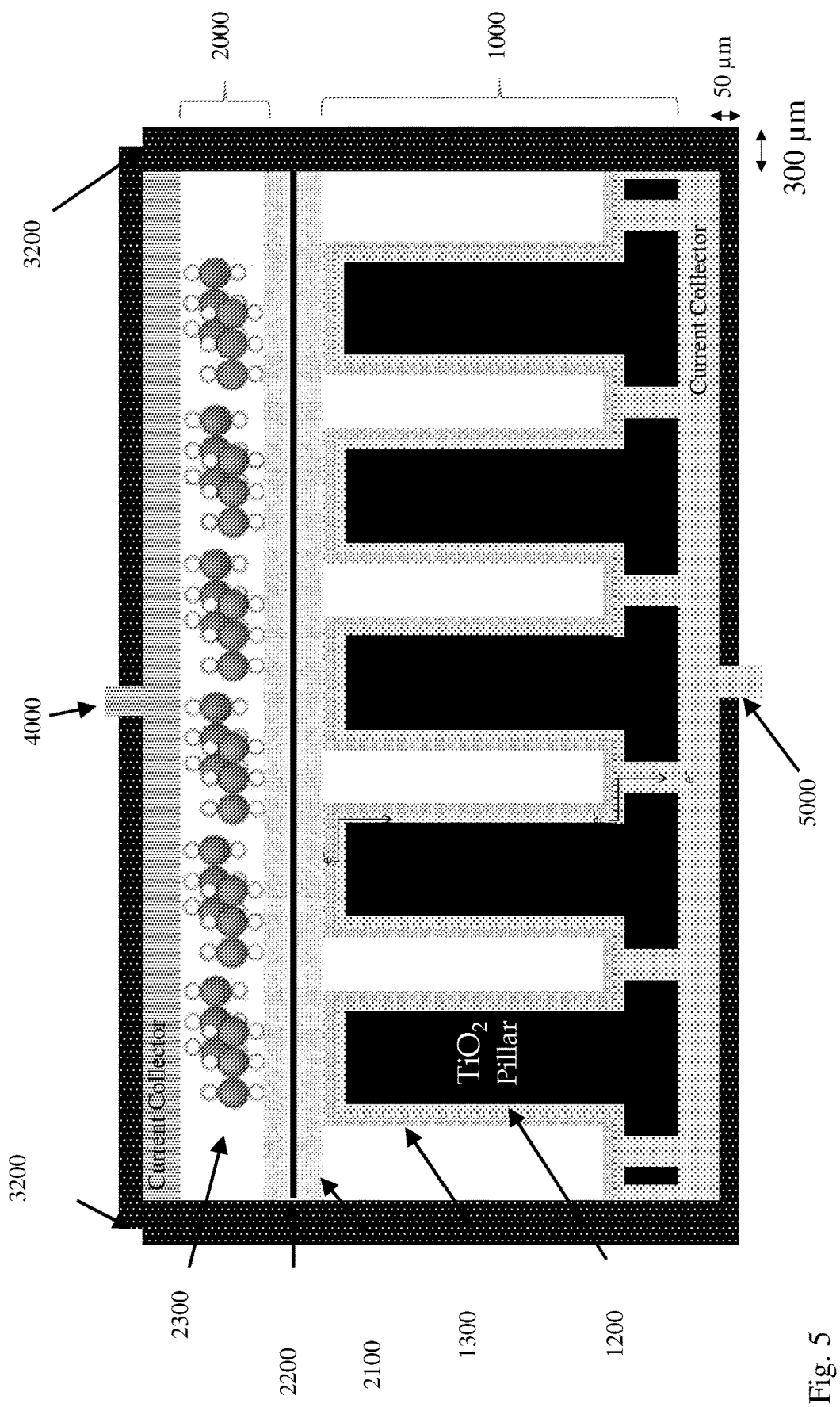
FIG. 5 is a simplified diagram illustrating packaged Ti MEMS battery.

FIG. 5 is a simplified diagram illustrating packaged Ti MEMS battery, showing the battery assembly of cell unit with anode and cathode inside the battery packaging. Note that the battery is not drawn to scale, but is enlarged to view the components The packaging approach may rely on titanium fastening techniques. In particular, the components can be encapsulated with titanium laser micro-welding packaging process that allows for hermetic sealing (helium leaking rate of $10^{-10}$ atm. cc/sec) of components. This method can be applied for sealing complex-shape packaging envelopes. The resulting package is sufficiently thin to be conformal and flexible, enabling a wide variety of novel applications.

Micro-laser welding of this titanium allows for hermetic sealing of complex surfaces and shapes while electric feed-throughs supply an electrical pathway through the packaging. With thin foils (50 μm), it is anticipated the thermal resistivity of the packaged battery to be minimal and that the heat generated during cycling will be easily dissipated even though the thermal conductivity of titanium is only 22 W/m·K. Detailed description of techniques for laser micro-welding are discussed further below, with respect to a titanium thermal module (TTM) or titanium thermal ground plane (TiTGP).

Figure 6:
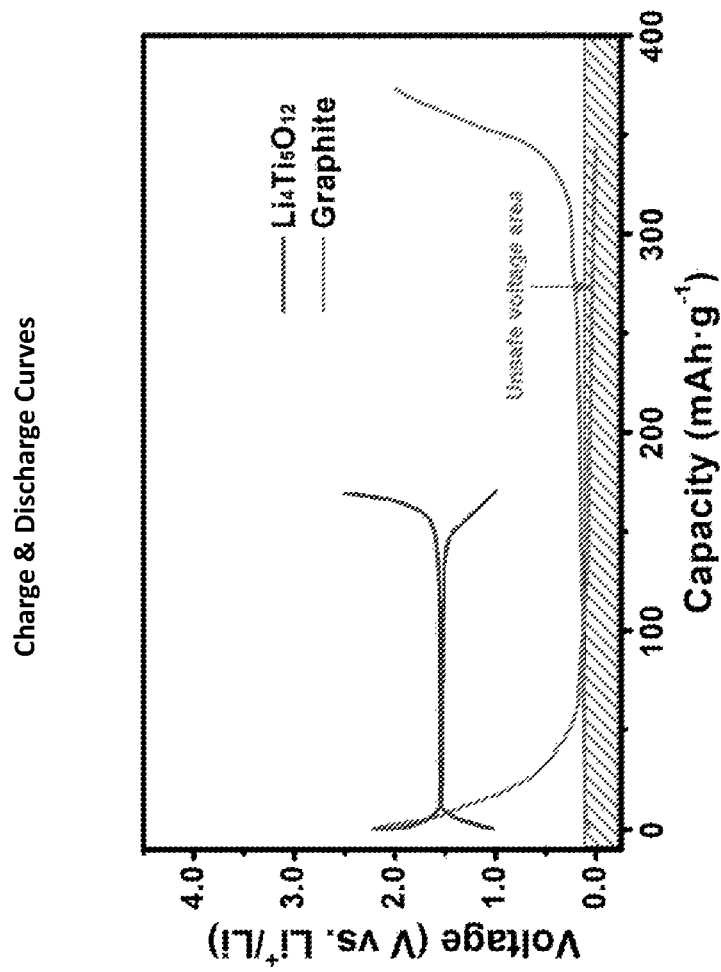
FIG. 6 illustrates a charge and discharge curves for commercial graphite anode LIB vs. commercially available titanium-based anode LIB.

FIG. 6 illustrates a charge and discharge curves for commercial graphite anode LIB vs. titanium-based anode TiLi. FIG. 6 shows that titanium-based anodes inherently avoid unsafe voltages, even during abuse conditions.

During lithium ion battery charging, lithium ions migrate from the cathode to embed themselves in the anode. As the graphite anode fills with lithium, the voltage drops and can enter into an unsafe voltage range. This is termed overcharge and can result in lithium deposition on the anode surface, leading to short circuit, or breakdown of solid electrolyte interphase (SEI), leading to overheating. As a consequence, there are exothermic reactions between SEI, underlying anode, and deposited lithium and the electrolyte that can contribute to heat generation and thermal instability.

Titanium-based anodes, however, inherently benefit from a higher lithium insertion potential than graphite (see FIG. 6). As the voltage drops and a titanium-based anode becomes fully charged, it does not reach the unsafe voltage area as does graphite. As a result, escalation from abuse or overcharge into overheating or short circuit is avoided and thermal stability is established.

Figure 7:
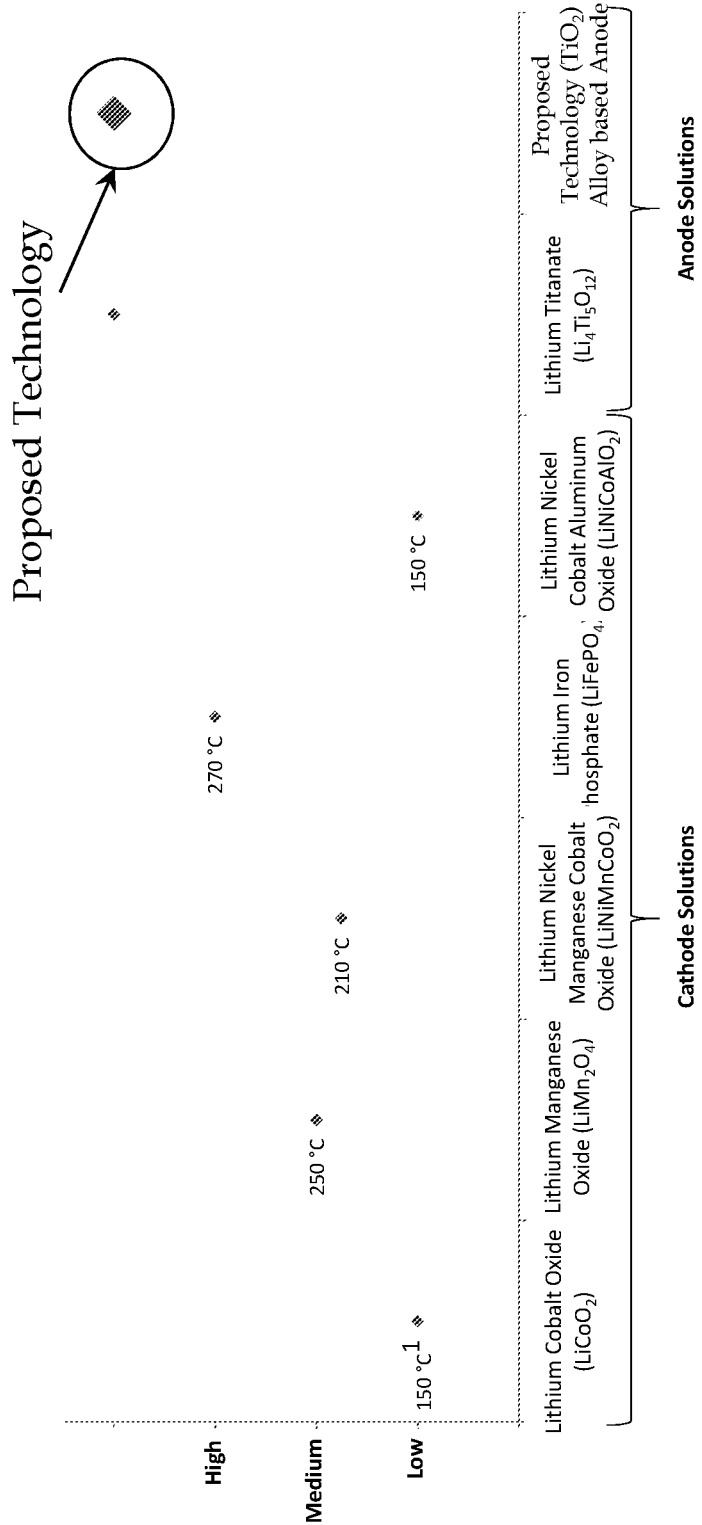
FIG. 7 illustrates the safety advantages of the TiMEMS battery architecture.

FIG. 7 illustrates the safety advantages of the TiMEMS battery architecture. FIG. 7 shows the temperature at which thermal runaway occurs, leading to catastrophic self-accelerated degradation. FIG. 7 demonstrates a substantial improvement in battery safety. As shown in FIG. 7, the failure temperature is in the range 300 Centigrade, far higher than competing lithium-based battery technologies.

Figure 8:
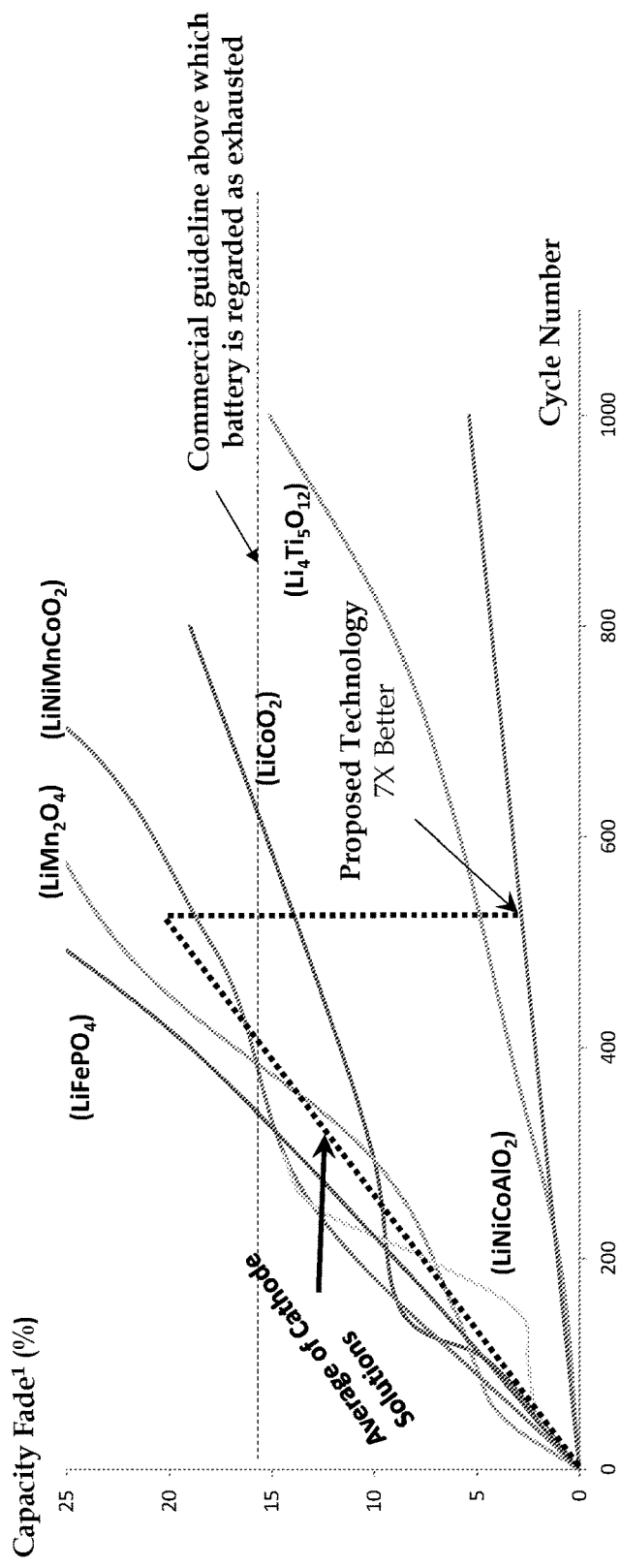
FIG. 8 illustrates the performance advantages of the TiMEMS battery architecture.

FIG. 8 illustrates the performance advantages of the TiMEMS battery architecture. The TiLi may outperform other existing battery technology on the market. Titanium anodes inherently have added protection against ageing and capacity fade/first cycle capacity loss common to silicon and graphite anodes. The titanium MEMS-based anodes take advantage of the low solid electrolyte interface film on titanium to provide a reliable battery performance. As can be seen in FIG. 8, the capacity fade is only 2% after 500 cycles, and only 5% after 1000 cycles. This represents a 7× improvement over competing technologies.

FIG. 9 shows a comparison of proposed Ti MEMS-based anode battery to SoA Micro-Batteries. So-called SoA batteries are lithium-based batteries wherein the graphite anode is replaced with a silicon-based anode. A crystalline silicon anode has a theoretical specific capacity of 4200 mAh/g, more than ten times that of anodes such as graphite (372 mAh/g). Each silicon atom can bind up to 4.4 lithium atoms in its fully lithiated state ($Li_{4.4}Si$), compared to one lithium atom per 6 carbon atoms for the fully lithiated graphite ($LiC_6$). The lattice distance, however, between silicon atoms multiplies as it accommodates lithium ions (lithiation), reaching 320% of the original volume. Accordingly, material fracture is a serious problem with this design. Nonetheless, as shown in FIG. 9, the TiLi battery outperforms silicon-based micro-battery in every category.

Figure 10:
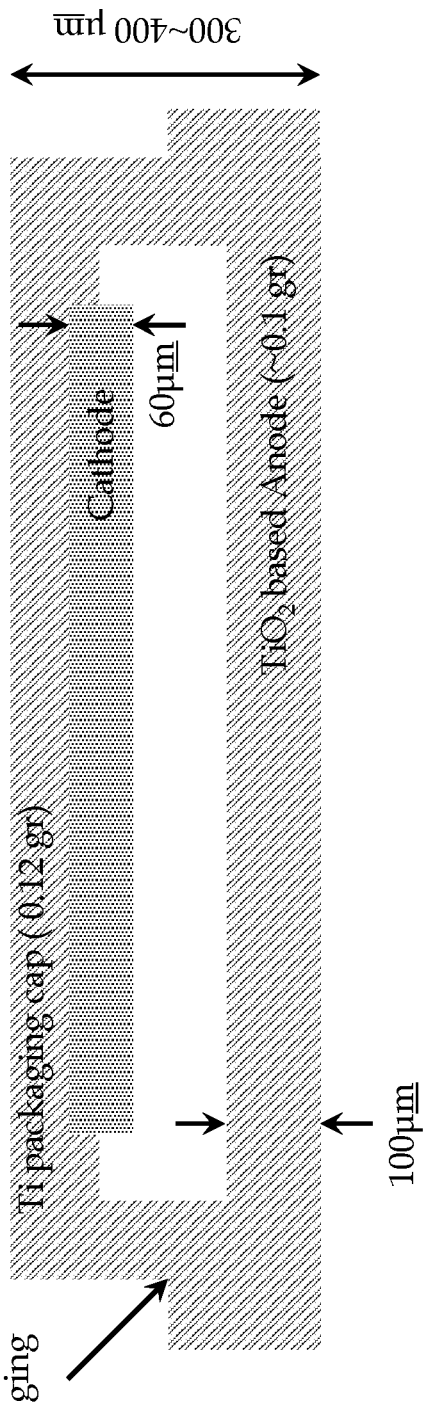
FIG. 10 illustrates the form factor and weight advantages of the TiMEMS battery architecture.

FIG. 10 illustrates the form factor and weight advantages of the TiMEMS battery architecture. Because of its very thin form factor (300-400 microns) the Ti-based battery may be relatively flexible. On a larger scale, our titanium MEMS anode is capable of conforming to different complex topographies, giving flexibility to our battery application. Accordingly, the TiLi battery may be made to fit into relatively complex shapes.

FIG. 11 summarizes the performance advantages of the TiMEMS battery architecture, in tabular form. The table in FIG. 11 includes additional performance metrics, such as energy volumetric density, package thickness, and energy per unit weight. In every metric, the TiLi battery meets or exceeds the requirements.

Lastly, the TiLi battery may be able to operate in harsh conditions, at for example, −45° C. and high altitude. There is substantially increased safety and reliability with this architecture. It is capable of maintaining its operating voltage even after a large number of charge/discharge cycles. It is capable of high energy densities and operating currents. And when coupled to a titanium thermal module to cool the device, the performance may be even better, as described further below.

As is well known, battery performance may deteriorate at high operating temperatures. In fact, excessive temperature is a primary failure mode for LiB as described above. Methods for dissipating heat may improve battery lifetime and performance.

Figure 12:
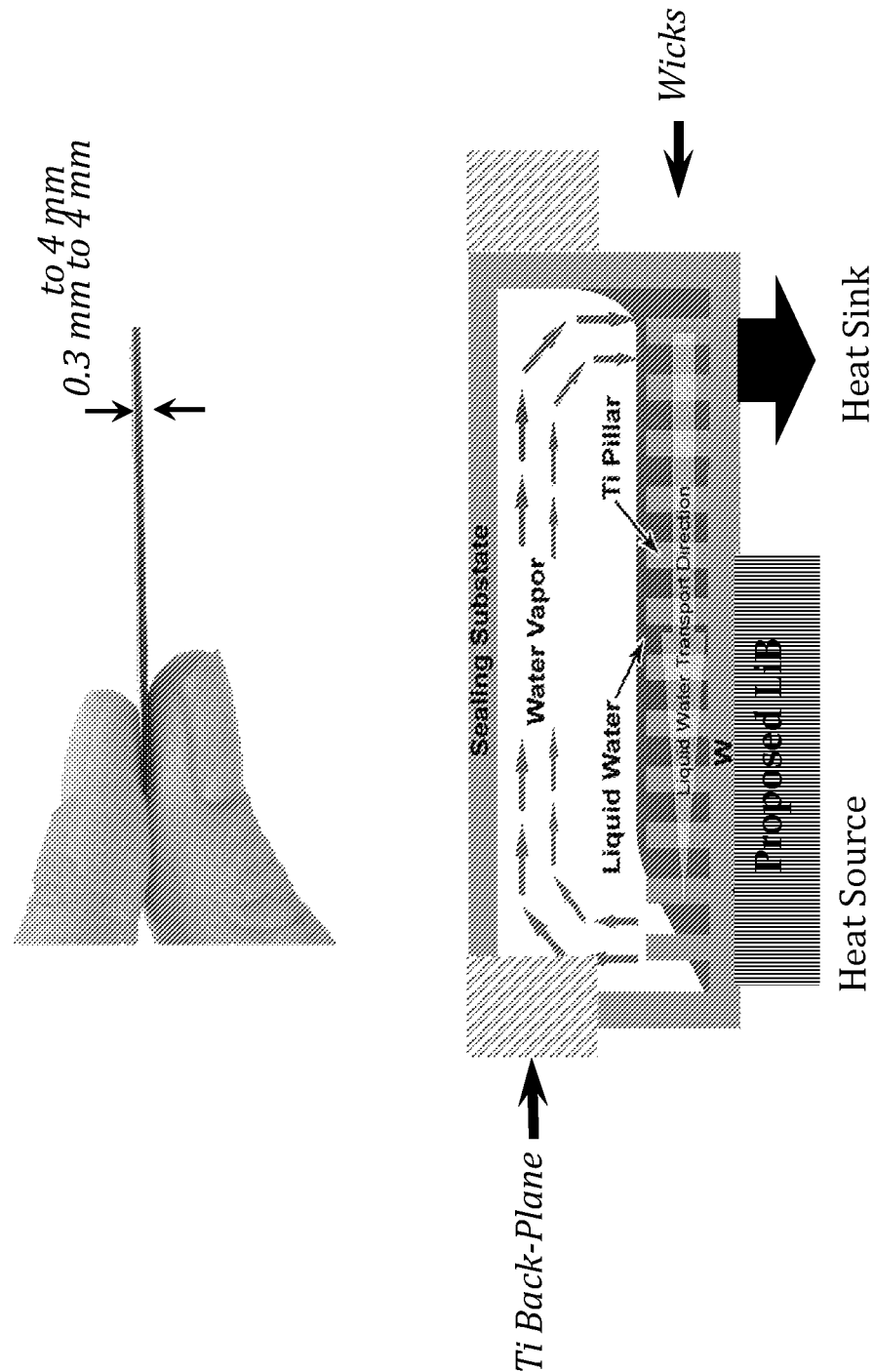
FIG. 12 is a table describing the required metrics vs estimated performance of TiMEMS-based anode battery.
Figure 13:
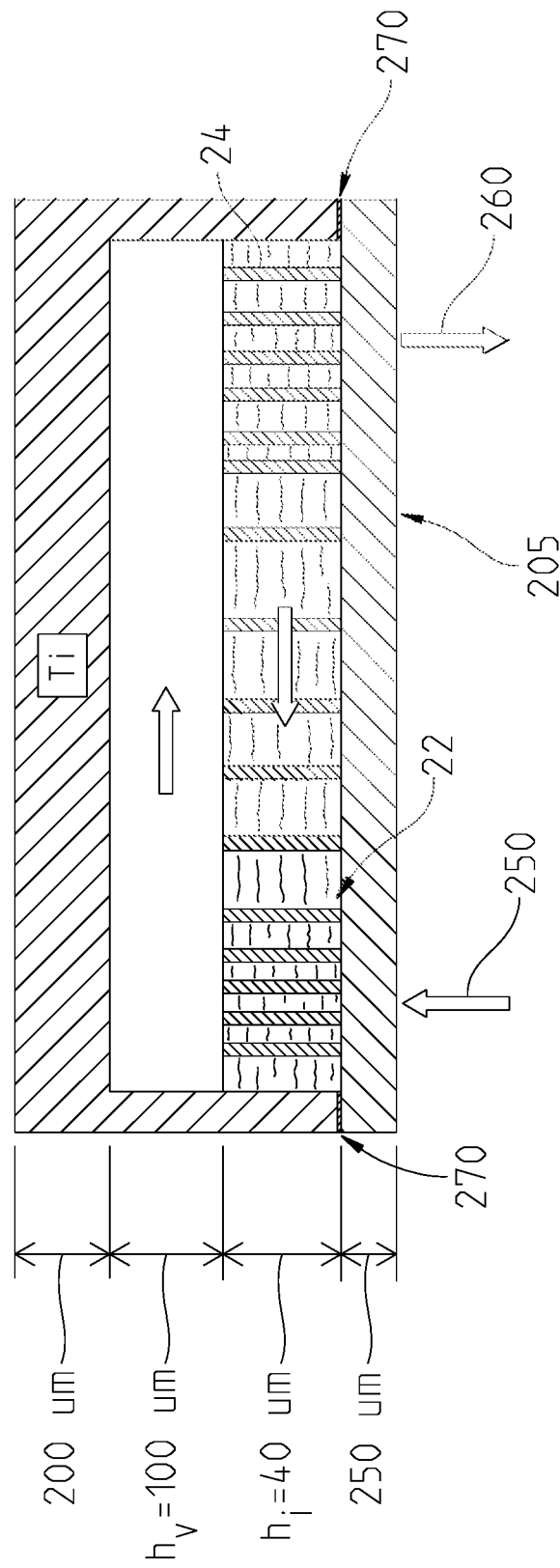
FIG. 13 is an illustrative embodiment of a titanium-based thermal ground plane, comprising a titanium substrate with a wicking structure, a backplane, and a vapor chamber.

FIG. 12 illustrates the inventive TiLi battery may be coupled to a heat spreader/heat dissipator. A convenient architecture for this heat spreader/heat dissipator is a two-phase thermal ground plane, such as that described in co-pending U.S. patent application Ser. No. 15/590,621, incorporated by reference and filed May 9, 2017. Using the architecture shown in FIG. 12, heating is expected to be minimal, and the heat generated during cycling will be easily dissipated from the TiLi battery, even though the thermal conductivity of titanium is only 22 W/m·K. The remainder of this disclosure is directed to the description and fabrication of the thermal module illustrated in FIGS. 12-24.

In one embodiment, the TiLi is coupled with a titanium based Thermal Ground Plane, two phase cooling device. Two-phase cooling devices are a class of devices that can transfer heat with very high efficiency, and may include: heat pipes, thermal ground planes, vapor chambers and thermosiphons, and the like. An exemplary titanium based thermal module or thermal ground plane is shown generically in FIG. 13.

In some embodiments, the present application provides two-phase cooling devices including at least three substrates. In some embodiments, one or more of the substrates is formed from microfabricated metal, such as but not limited to titanium, aluminum, copper, or stainless steel. In some embodiments the substrate may be formed as a thermal ground plane structure suitable for use in electronic devices. In some embodiments, the two-phase device may comprise a predetermined amount of at least one suitable working fluid, where the working fluid adsorbs or rejects heat by changing phases between liquid and vapor.

In some embodiments, the two-phase cooling devices may include a metal, such as but not limited to titanium, aluminum, copper, or stainless steel, and a substrate comprising a plurality of etched microstructures, forming a wicking structure wherein one or more of the microstructures have a height of between about 1-1000 micrometers, a width of between about 1-1000 micrometers, and a spacing of between about 1-1000 micrometers. In some embodiments a vapor cavity may be in communication with the plurality of metal microstructures. In some embodiments at least one intermediate substrate may be in communication with the wicking structure and the vapor region. In some embodiments, a fluid may be contained within the wicking structure and vapor cavity for transporting thermal energy from one region of the thermal ground plane to another region of the thermal ground plane, wherein the fluid may be driven by capillary forces within the wicking structure.

In some embodiments the cooling device can be configured for high capillary force in the wicking structure, to support large pressure differences between the liquid and vapor phases, while minimizing viscous losses of the liquid flowing in the wicking structure. In some embodiments, the cooling device may be a thermal ground plane which can be made very thin, and could possibly transfer more thermal energy than can be achieved by earlier TGP's. In some embodiments, different structural components could be located in an evaporator region, an adiabatic region and a condenser region. In some embodiments, an evaporator region may contain an intermediate substrate that comprises a plurality of microstructures that when mated with the wicking structure form high effective aspect ratio structures. In some embodiments, the intermediate substrate features are interleaved with the wicking structure features to increase the effective aspect ratio of the wicking structure. In other words, the intermediate substrate features may mate with the wicking structure features, or fit into them conformally, forming fluid channels with high effective aspect ratio and thus enhanced capillary action. In some embodiments, an adiabatic region may contain an intermediate substrate positioned in close proximity to the wicking structure to separate the vapor in the vapor chamber from the liquid in the wicking structure. In some embodiments, a condenser region may contain an intermediate substrate that has large openings (compared to the microstructure) so that the wicking structure is in direct communication with the vapor chamber. In some embodiments, a condenser region might not contain an intermediate substrate so that the wicking structure is in direct communication with the vapor chamber.

Microfabricated substrates can be used to make more robust, shock resistant two-phase cooling devices, which may be in the form of Thermal Ground Planes (TGPs). Although a variety of materials for these substrates may be employed, as described in the incorporated references, metal, such as but not limited to titanium, aluminum, copper, or stainless steel substrates have been found suitable for TGPs.

The choice of metal can depend upon the various applications and cost considerations. There are advantages to various metals. For example, copper offers the highest thermal conductivity of all the metals. Aluminum can be advantageous for applications where high thermal conductivity is important and weight might be important. Stainless steel could have advantageous in certain harsh environments.

Titanium has many advantages. For example, titanium has a high fracture toughness, can be microfabricated and micromachined, can resist high temperatures, can resist harsh environments, can be bio-compatible. In addition, titanium-based thermal ground planes can be made light weight, relatively thin, and have high heat transfer performance. Titanium can be pulse laser welded. Since titanium has a high fracture toughness, it can be formed into thin substrates that resist crack and defect propagation. Titanium has a relatively low coefficient of thermal expansion of approximately $8.6 \times 10^{-6}$/K. The low coefficient of thermal expansion, coupled with thin substrates can help to substantially reduce stresses due to thermal mismatch. Titanium can be oxidized to form Nano Structured Titania (NST), which forms stable and super hydrophilic surfaces. In some embodiments, titanium (Ti) substrates with integrated Nano Structured Titania (NST) have been found suitable for TGP's.

Metals, such as but not limited to titanium, aluminum, copper, or stainless steel, can be microfabricated with controlled characteristic dimensions (depth, width, and spacing) ranging from about 1-1000 micrometers, to engineer the wicking structure and intermediate substrate for optimal performance and customized for specific applications. In some embodiments, the controlled characteristic dimensions (depth, width, and spacing) could range from 10-500 micrometers, to engineer the wicking structure for optimal performance and customized for specific applications.

In some embodiments, titanium can be oxidized to form nanostructured titania (NST), which could provide super hydrophilic surfaces and thereby increase capillary forces, and enhance heat transfer. In some embodiments, the NST can be comprised of hair-like patterns with a nominal roughness of 200 nanometers (nm). In some embodiments, NST can have a nominal roughness of 1-1000 nm.

In some embodiments aluminum can be oxidized to form hydrophilic nanostructures, to provide super hydrophilic coatings. In some embodiments, sintered nanoparticles and/or microparticles could be used to provide super hydrophilic surfaces and thereby increase capillary forces, and enhance heat transfer.

In some embodiments, titanium can be coated on another type of substrate forming a titanium film. The titanium film can be oxidized to form nano-structured titania (NST), and thereby provide super hydrophilic surfaces.

Titanium is a material that can be microfabricated using cleanroom processing techniques, macro-machined in a machine shop, and hermetically packaged using a pulsed laser micro welding technique. When the thermal ground plane is comprised of only titanium or titania as the structural material, the various components can be laser welded in place, without introducing contaminants, which could possibly produce non-condensable gasses, contribute to poor performance, and possibly lead to failure. In addition, titanium and titania have been shown to be compatible with water, which can contribute to long lifetimes and minimal non-condensable gas generation. Accordingly, the titanium substrate may be connected to the titanium backplane by a laser weld, to form a hermetically-sealed vapor cavity.

Metals can be bonded to form hermetic seals. In some embodiments, titanium substrates can be pulsed laser microwelded together to form a hermetic seal. In other embodiments, copper, aluminum, and stainless steel substrates could be welded using a variety of techniques, such as but not limited to, soldering, brazing, vacuum brazing, TIG, MIG, and many other well-known welding techniques.

The present application describes the fabrication of metal-based Thermal Ground Planes (TGPs). Without loss of generality, the present application discloses thermal ground plane embodiments that could be comprised of three or more metal substrates. Any of these embodiments of the thermal ground plane or thermal module may be used in conjunction with the TiLi battery described above.

An embodiment can comprise three substrates (of which one or more can be constructed using a metal, such as but not limited to titanium, aluminum, copper, or stainless steel) to form a thermal ground plane. In some embodiments, titanium substrates could be used to form a thermal ground plane. In some embodiments, one substrate supports an integrated super-hydrophilic wicking structure 220, a second substrate consists of a deep-etched (or macro-machined) vapor cavity, and a third intermediate substrate 110 may consist of microstructures 112 and are in communication with the wicking structure 220 and the vapor chamber 300. The substrates could be laser micro welded together to form the thermal ground plane.

The working fluid can be chosen based upon desired performance characteristics, operating temperature, material compatibility, or other desirable features. In some embodiments, and without loss of generality, water could be used as the working fluid. In some embodiments, and without loss of generality, helium, nitrogen, ammonia, high-temperature organics, mercury, acetone, methanol, ethanol, heptane, pentane, caesium, potassium, sodium, lithium, or other materials, could be used as the working fluid.

The current TGP can provide significant improvement over earlier titanium-based thermal ground planes. For example, the present invention could provide significantly higher heat transfer, thinner thermal ground planes, thermal ground planes that are less susceptible to the effects of gravity, and many other advantages.

Figure 14A:
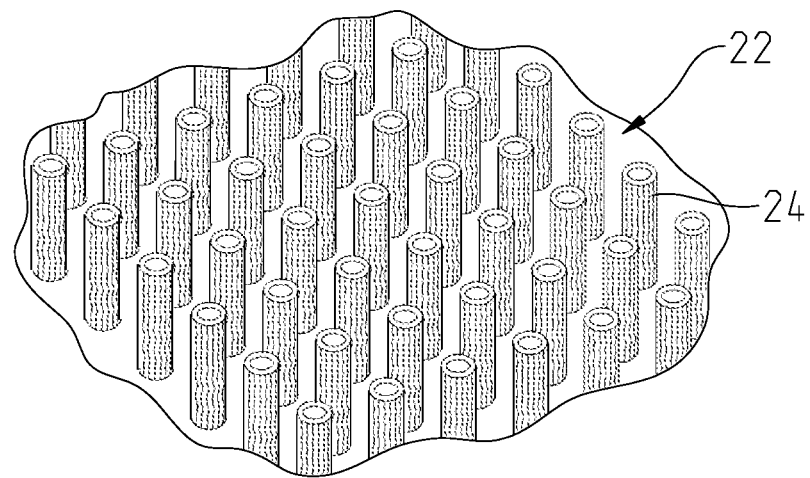
FIG. 14 is an illustrative embodiment of earlier titanium substrates with a wicking structure: (A) the wicking structure comprises pillars, (B) the wicking structure comprises channels or grooves.
Figure 14B:
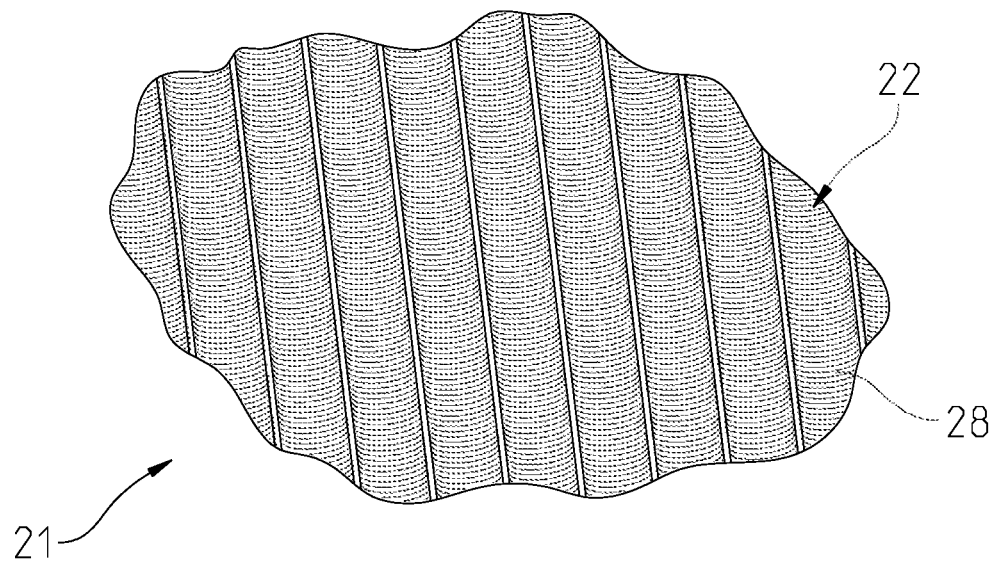

The wicking structure can be formed from a plurality of pillars, channels, grooves, trenches, or other geometric structures. For example, FIG. 14(A) illustrates an earlier TGP where a titanium wicking structure 22 is comprised of pillars 24. FIG. 14(B) illustrates an earlier TGP where a titanium wicking structure 22' is comprised of channels or grooves 28 on a titanium substrate 21.

Figure 15A:
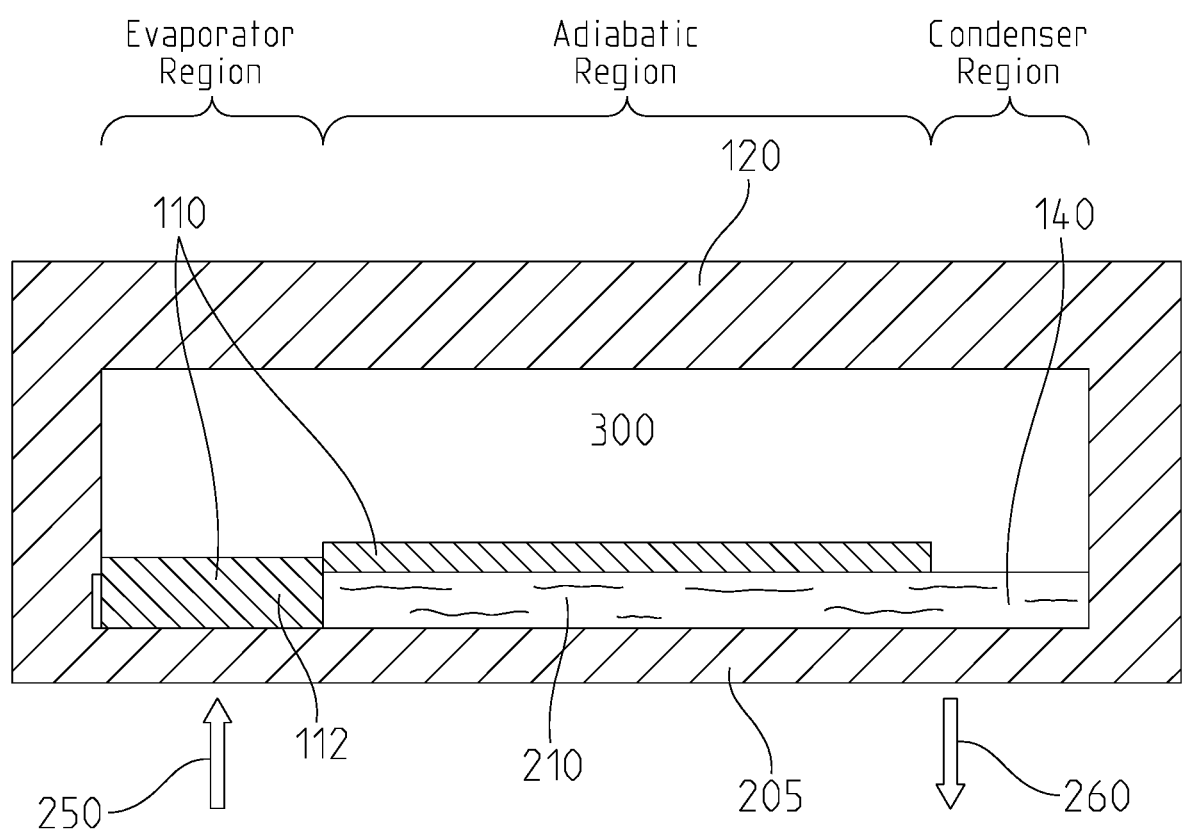
FIG. 15 is an illustrative embodiment of a metal-based thermal ground plane with an intermediate substrate in communication with a wicking structure and a vapor chamber. The intermediate layer could comprise microstructures. (A) shows a profile view depicting components of an embodiment, (B) shows an exploded view of structural components of an embodiment.
Figure 15B:
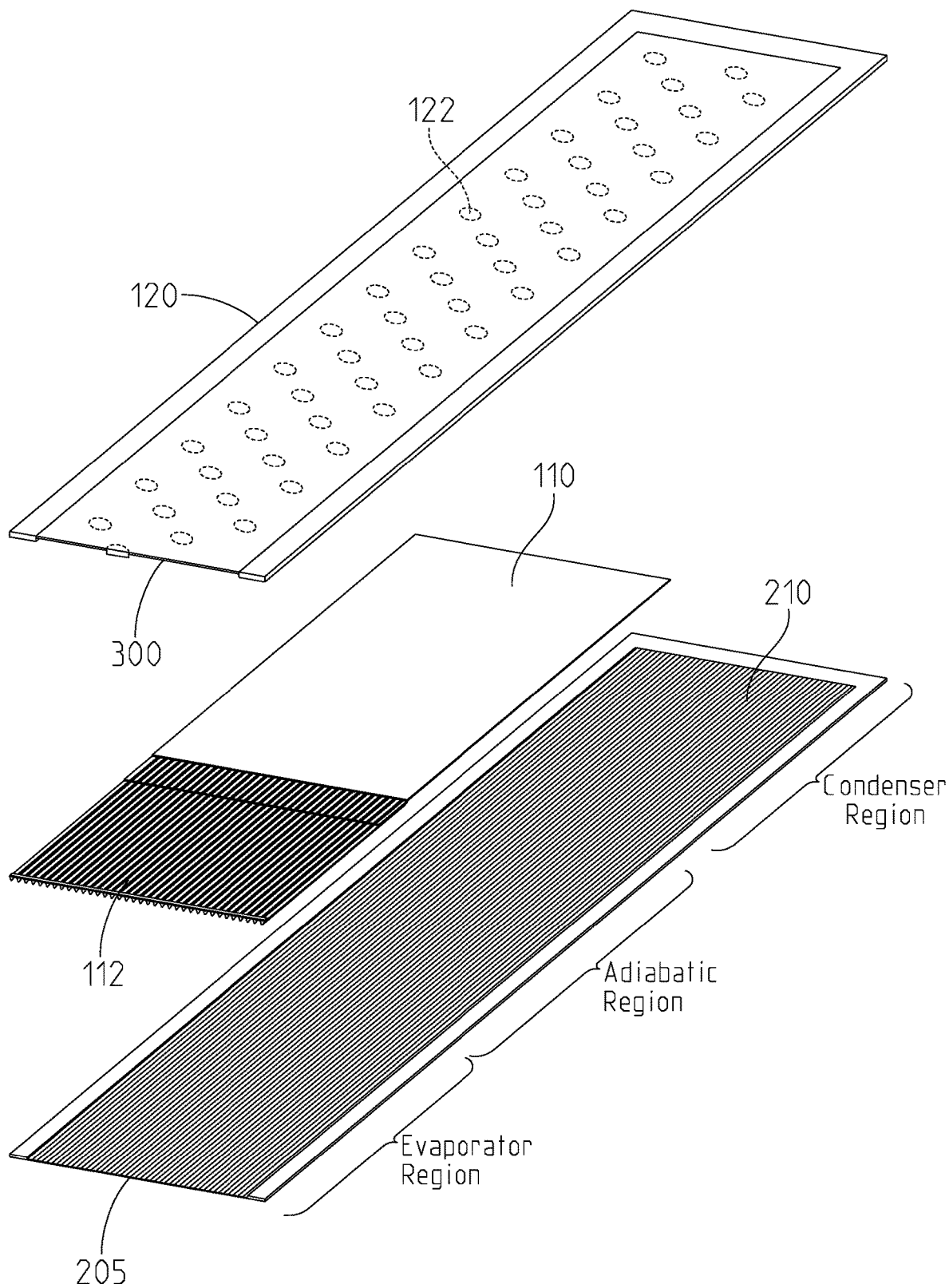

FIG. 15 illustrates an embodiment of a novel metal-based thermal ground plane with an intermediate substrate 110 in communication with a wicking structure 220 and a vapor chamber 300. The intermediate layer could comprise microstructures 112. FIG. 15(A) shows a profile view depicting components of an embodiment, while FIG. 15(B) shows an exploded view of structural components of an embodiment.

The metal substrate 210 could be bonded to a metal backplane 120 to form a hermetically-sealed vapor cavity 300. The vapor cavity 300 may therefore be enclosed by the metal substrate 210 and the metal backplane 120. For example, in an embodiment, a titanium substrate could be pulsed laser micro-welded to a titanium backplane 120 to form a hermetically sealed vapor cavity.

In some embodiments, a plurality of intermediate substrates 110 could be used, where at least one different intermediate substrate 110 could be used for each different region of the thermal ground plane. The plurality of intermediate substrates 110 could be positioned in close proximity to each other to collectively provide overall benefit to the functionality of the thermal ground plane.

In some embodiments, the intermediate substrate 110 could contain regions that are comprised of a plurality of microstructures 112, with characteristic dimensions (depth, width, and spacing) ranging from 1-1000 micrometers. In some embodiments, the intermediate substrate 110 could contain regions that are comprised of a plurality of microstructures 112, with dimensions (depth, width, and spacing) ranging from 10-500 micrometers.

The at least one intermediate substrate 110 may contain regions that are comprised of a plurality of microstructures 112, regions that are comprised of solid substrates, and regions that are comprised of at least one opening in the at least one intermediate substrate 110 (that is large compared to the microstructures 112, and for example openings could range in dimension of 1 millimeter to 100 millimeters, or 1 millimeter to 1000 millimeters.

In some embodiments, the opening in the intermediate substrate 110 for chosen regions of the thermal ground plane could be achieved by simply not providing an intermediate substrate 110 in those regions. Thermal energy can be supplied by a heat source 250 and removed by a heat sink 260. Thermal energy can be transferred from one region (evaporator region) of the metal substrate 210 to another region (condenser region) of the metal substrate 210. In the evaporator region, the local temperature is higher than the saturation temperature of the liquid/vapor mixture, causing the liquid 140 to evaporate into vapor, thereby absorbing thermal energy due to the latent heat of vaporization.

The vapor residing in the vapor chamber 300 can flow from the evaporator region through the adiabatic region to the condenser region. The heat sink 260 could absorb heat from the condenser region causing the local temperature to be lower than the saturation temperature of the liquid/vapor mixture, causing the vapor to condense into the liquid phase, and thereby releasing thermal energy due to the latent heat of vaporization.

The condensed liquid 140 could predominantly reside in the wicking structure 220 and could flow from the condenser region through the adiabatic region to the evaporator region as a result of capillary forces.

As a result it could be advantageous for high-performance heat pipes to: (1) exhibit minimal viscous losses for the liquid 140 flowing through the wicking structure 220, and to (2) exhibit maximal capillary forces in the evaporator region. In many practical thermal ground plane embodiments, minimal viscous losses and maximal capillary forces are difficult to achieve simultaneously. Introducing an intermediate substrate 110 with a plurality of microstructures 112, configured as appropriate in each of the three regions could provide a means in which the thermal ground plane could have reduced viscous losses in some regions, while exhibiting increased capillary forces in other regions, compared to earlier TGP's with more or less the same structure over a majority of the interior.

In some embodiments, supporting pillars (standoffs) are used to mechanically support the spacing between the backplane 120 and the wicking structure 220 and/or intermediate substrate 110. In some embodiments, the supporting pillars (standoffs) provide controlled spacing for the vapor chamber 300. The supporting pillars (standoffs) could be microfabricated using chemical wet etching techniques or other fabrication techniques (as described above). Accordingly, the backplane may include standoffs that are in communication with the intermediate substrate and/or the metal substrate, for structurally supporting the thermal ground plane.

FIG. 16 depicts structural components of an embodiment where the different structural components are located in an evaporator region, an adiabatic region and a condenser region: (A) shows an evaporator region of an embodiment where the intermediate substrate 110 comprises a plurality of microstructures 112 that are positioned to increase the effective aspect ratio of the wicking structure 220. The fingers (microstructures 112) from the intermediate substrate 110 are interleaved with channels in the wicking structure 220, thereby creating double the number of higher effective aspect ratio features, compared to the lower effective ratio features of the wicking structure 220 without the intermediate substrate 110. FIG. 16(B) shows an adiabatic region of an embodiment where the intermediate substrate 110 is positioned in close proximity to the wicking structure 220, and (C) shows a condenser region of an embodiment, where the wicking structure 220 is in direct communication with the vapor chamber 300. (D) shows the intermediate substrate 110 as a whole.

Accordingly, the thermal ground plane may have an evaporator region, an adiabatic region, and a condenser region. The intermediate substrate, in turn, may have a different topography in the different regions, and in particular in the evaporator region relative to an adiabatic region.

Figure 16A:
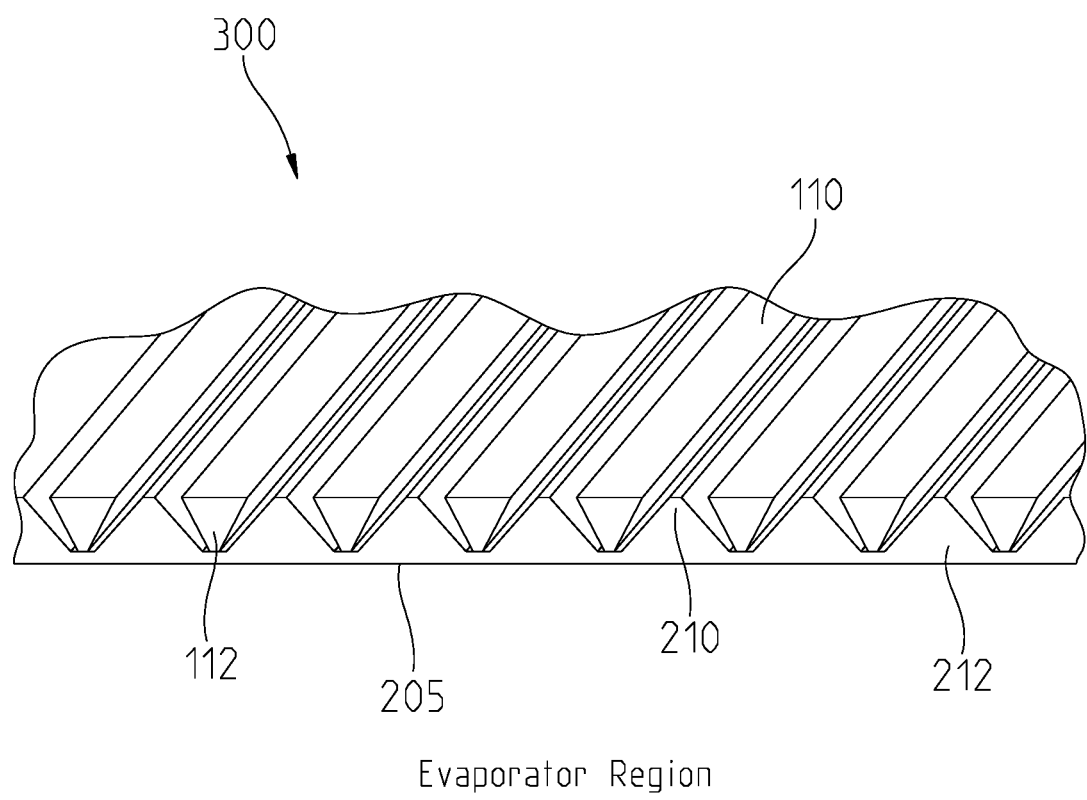
FIG. 16 depicts structural components according to an illustrative embodiment where the different structural components are located in an evaporator region, an adiabatic region and a condenser region: (A) shows an evaporator region of an embodiment where the intermediate substrate comprises a plurality of microstructures that are interleaved with the wicking structure, (B) shows an adiabatic region of an embodiment where the intermediate substrate is positioned in close proximity to the wicking, (C) shows a condenser region of an embodiment where the wicking structure is in direct communication with the vapor chamber, and (D) shows detail of an embodiment of an intermediate substrate.

FIG. 16(A) depicts an embodiment where the intermediate substrate 110 comprises a plurality of microstructures 112 that are interleaved with the wicking structure 220 of the metal substrate 210. By interleaving the microstructures 112 of the intermediate region with the wicking structure 220 of the metal substrate 210, the interface between the solid and liquid can be substantially increased. This could increase the capillary forces that are applied to the liquid, and could increase the amount of heat transferred from the metal solid to the liquid.

Figure 16B:
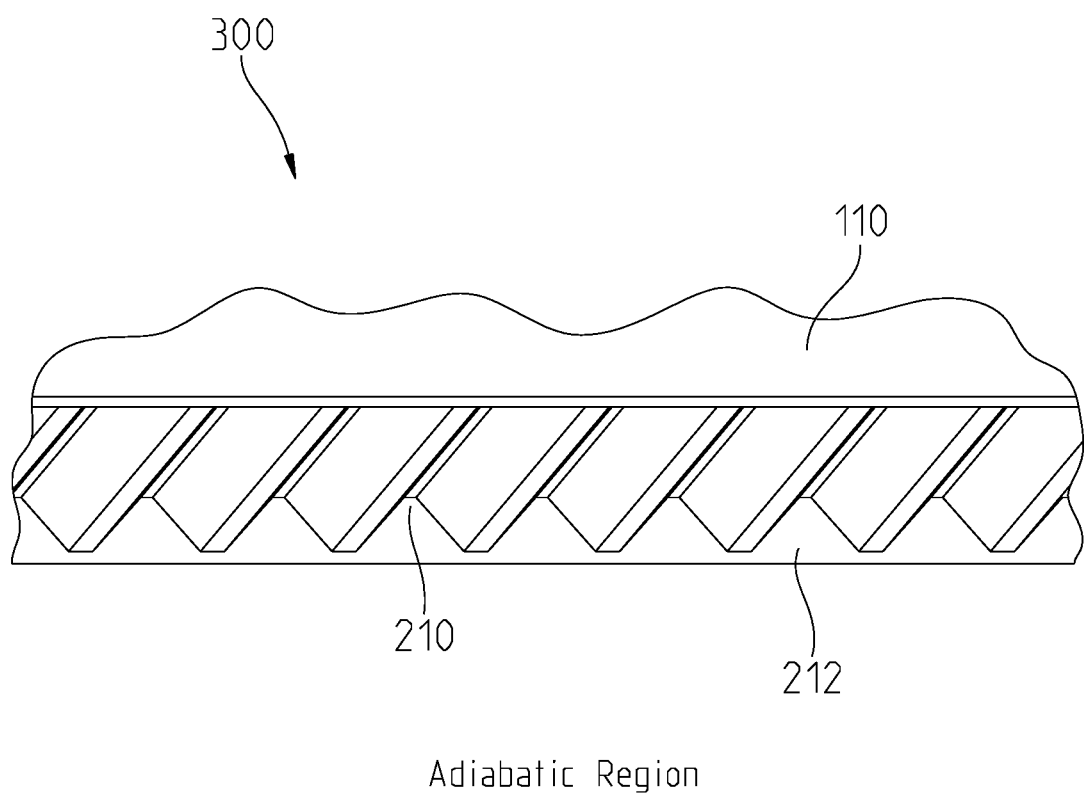

FIG. 16(B) shows an adiabatic region of an embodiment where the intermediate substrate 110 is positioned in close proximity to the wicking structure 220. A solid intermediate substrate 110 could be used to isolate the vapor chamber 300 from the wicking structure 220. By isolating the vapor chamber 300 from the wicking structure 220, the solid-liquid interface area could be increased, and the liquid could fill substantially the wicking structure 220, without a meniscus occupying the channel, and which could provide a higher mass flow rate for the liquid with less viscous pressure drop, compared to the earlier TGP's where the liquid in the wicking structure 220 could be exposed directly to the vapor in the vapor chamber 300 with a meniscus residing at the liquid/vapor interface.

Figure 16C:
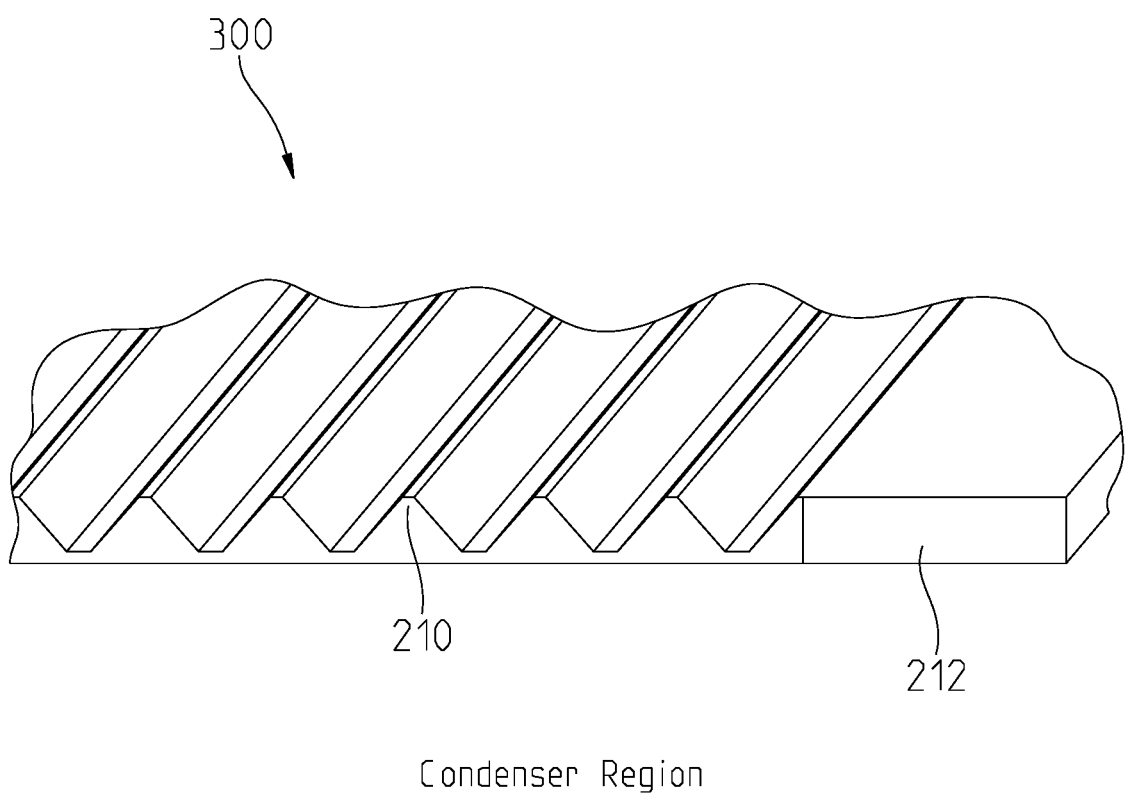
Figure 16D:
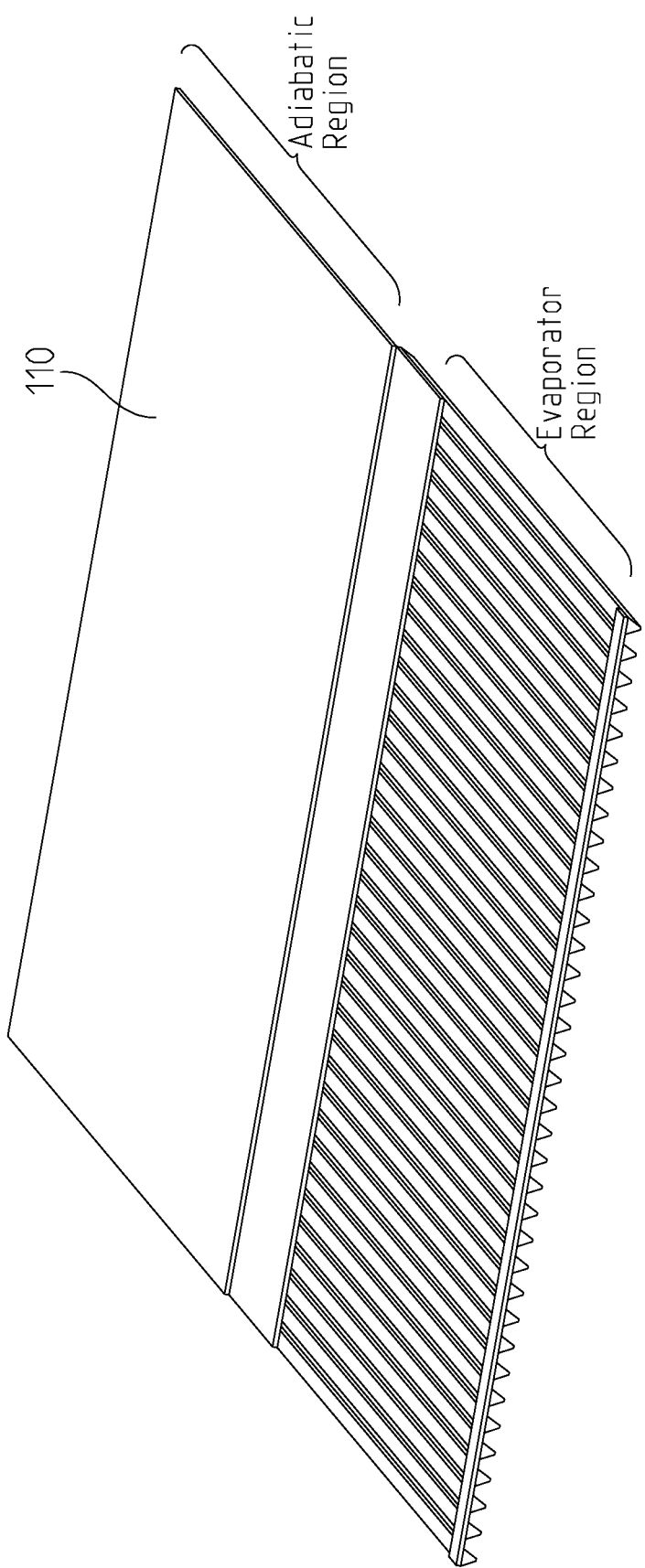

FIG. 16(C) shows a condenser region of an embodiment where the wicking structure 220 is in direct communication with the vapor chamber 300. When the wicking structure 220 is in direct communication with the vapor chamber 300, vapor could more easily condense onto the wicking structure 220. Furthermore, in regions, such as the condenser, there might not be significant differences in pressure between the liquid and vapor phases, and an intermediate substrate 110 may not provide significant advantages.

However, in other embodiments, if the condenser region was relatively large and there was significant pressure difference between the liquid and vapor phases, an intermediate substrate 110 could provide advantages in the condenser region as well.

FIG. 16 (D) shows an illustrative embodiment of an implementation of an intermediate substrate 110 as described above. The evaporator region of the intermediate substrate 110 includes rows of wedge shaped fingers supported across each end, such that when the TGP is assembled, the fingers interleave with the substrate wicking microstructures 112 as shown in FIG. 4(A), where the interleaved structures are exposed to the vapor chamber 300. The adiabatic region of the intermediate substrate 110 is a cover that overlays a portion of the wicking microstructures 112, as shown in FIG. 4(B). The condenser region may not require an intermediate substrate 110 component in some embodiments, as shown in FIG. 4(C).

The aspect ratio is commonly defined as the ratio of one major dimension of a structure to another major dimension of a structure. For pillars, channels, trenches, grooves or other features used in heat pipe applications, the effective aspect ratio may refer to the ratio between the height and the width of the region occupied by a fluid, such as a liquid 140 flowing through a wicking structure 220. In some embodiments, the intermediate substrate 110 may include one section (as shown by example in FIG. 16(A)) that in combination with the wicking structure 220 provides an effective aspect ratio that is substantially higher than the effective aspect ratio provided only by the wicking structure 220. In other words, the intermediate substrate 110 may have a region with a plurality of protrusions that fit conformally into the wicking structure 220, to form narrow fluid passages through which the fluid is driven by capillary forces. The protrusion may be shaped to fit into features in the wicking structure 220, as shown in FIG. 16(A).

For some desirable micromachining processes, such as wet chemical etching, it may be difficult to achieve a high aspect ratio in the wicking structure 220. Interleaving two structures may achieve a higher effective aspect ratio in the wicking structure, than could otherwise be achieved using a single wet-etched structure. The intermediate substrate 110 may include another section (as shown by example in FIG. 16(B) that is basically a cap on the wicking structure 220 to minimize viscous losses, isolate the liquid from the vapor that is in close proximity above, and improve flow volume. A third section (as shown by example in FIG. 16(C)), where the intermediate substrate 110 is comprised of openings, that are more open than said microstructures 112, to facilitate direct communication between the wicking structure 220 and the vapor region, and promote condensation. Accordingly, the openings of the intermediate substrate may be substantially more open than said microstructures, so the wicking structure and vapor chamber could be in direct communication, in at least one region of the thermal ground plane.

Thus, the addition of the intermediate substrate 110 allows for optimization of the wicking structure 220 in each of the three operational regions of the cooling device, and in a way that could be compatible with micromachining processes, such as wet etching techniques, and assembly techniques.

Without loss of generality, the wicking structure 220 could be formed by dry etching, wet chemical etching, other forms of micromachining, macromachining, sawing with a dicing saw, and many other types of processes. In some embodiments, dry etching could provide high aspect ratio channels, where the depth is comparable or perhaps even larger than the width of the channels. However, dry etching may be limited to smaller regions and may not be desirable for large-scale manufacturing, compared to wet etching processes. Mask-based wet etching could be desirable as it could be applicable to relatively large etch regions, could be cost effective, and could be compatible with high-volume manufacturing. In some embodiments, photolithography-based methods could be used to dry or wet etching.

In some embodiments the wicking structure 220 could be formed by standard wet chemical etching techniques. In some embodiments, wet chemical etching can limit the aspect ratio, which is the ratio of the wicking channel depth to the wicking channel width. In some embodiments that use wet etching, the wicking channel width can be at least 2 to 2.5 times wider than the wicking channel etch depth. In some embodiments, where the wicking channel width is at least 2 to 2.5 times wider than the wicking channel etch depth, there could be significant disadvantages to low effective aspect ratio wicking channels.

The pressure between the vapor and liquid phases can be described by the Laplace pressure, $\Delta P = P_v - P_l = 2\gamma/R$, where $P_v$ is the vapor pressure, $P_l$ is the liquid pressure, $\gamma$ is the surface tension, and R is the radius of curvature of the surface. A high pressure difference between the liquid and vapor phases could be obtained by decreasing the radius of curvature, R.

Generally, a smaller radius of curvature can be achieved by having material surfaces that exhibit low contact angles, and by forming geometries with relatively small geometric dimensions. In many embodiments, it may be desirable to have low viscous losses for the liquid flowing through the wicking structure 220. Small geometric dimensions in the wicking structure 220 can significantly increase the viscous losses of liquid flowing through the wicking structure 220. Therefore, in some embodiments, it may be difficult to achieve low viscous losses, and have a meniscus with a small radius of curvature that can support a high pressure difference between the vapor and liquid phases. The current application discloses a means in which some embodiments can be configured for maximum capillary forces, support large pressure differences between the liquid and vapor phases, for example in the evaporator region. The current application discloses a means in which some embodiments can be configured to minimize viscous losses of the liquid flowing in the wicking structure 220, by using different structures in the different regions.

FIG. 17 shows profile views of structural components of an illustrative embodiment where the structures are non-wetted (i.e. dry) and are wetted by a liquid: (A) non-wetted structural components in the evaporator region, (B) wetted structural components in the evaporator region, (C) non-wetted structural components in the adiabatic region, (D) wetted structural components in the adiabatic region, (E) non-wetted structural components in the condenser region, (F) wetted structural components in the condenser region.

Figure 17A:
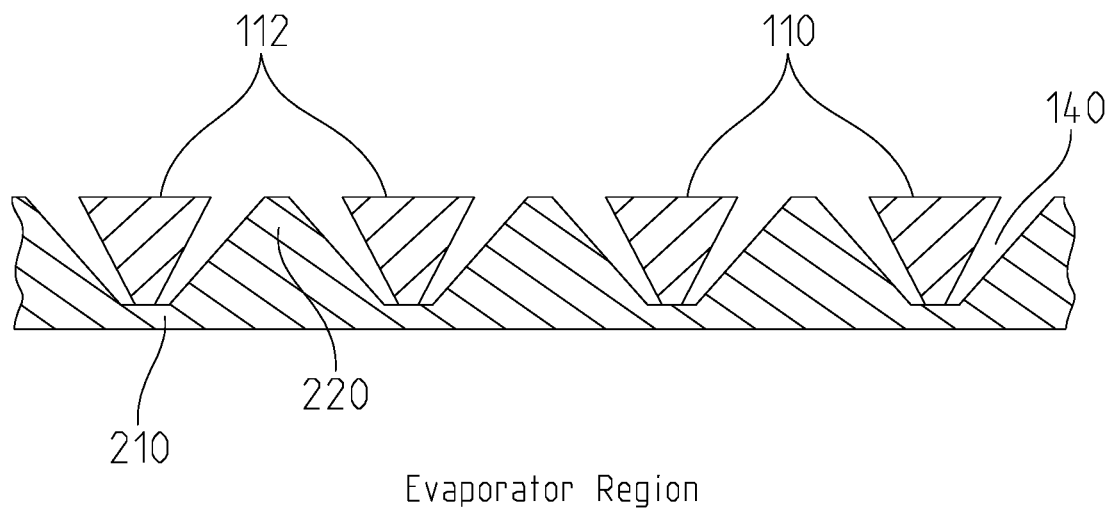
FIG. 17 is an illustrative embodiment of profile views of structural components of an embodiment where the structures are non-wetted (i.e. dry) and wetted by a liquid: (A) non-wetted structural components in the evaporator region, (B) wetted structural components in the evaporator region, (C) non-wetted structural components in the adiabatic region, (D) wetted structural components in the adiabatic region, (E) non-wetted structural components in the condenser region, (F) wetted structural components in the condenser region.

FIG. 17(A) shows a profile view of an illustrative embodiment where the intermediate substrate 110 comprises a plurality of microstructures 112 that are interleaved with the wicking structure 220 of the metal substrate 210.

Figure 17B:
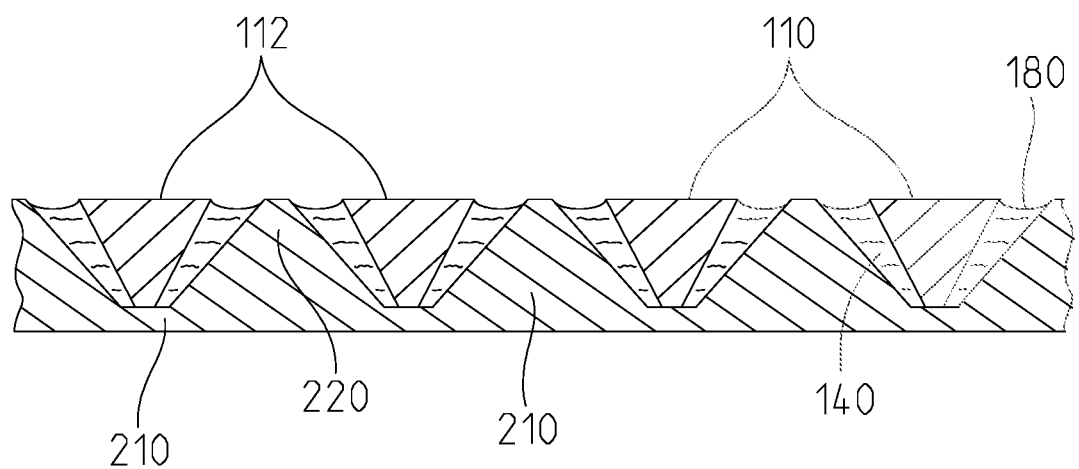

FIG. 17(B) shows a profile view of an illustrative embodiment where the intermediate substrate 110 comprises a plurality of microstructures 112 that are interleaved with the wicking structure 220 of the metal substrate 210, and where the microstructures 112 and wicking structure 220 are wetted by a liquid 140.

By interleaving the microstructures 112 of the intermediate substrate 110 with the wicking structure 220 of the metal substrate 210, the interface area between the solid and liquid 140 could be substantially increased. This could increase the capillary forces that are applied to liquid 140, and could increase the amount of heat transferred from the metal solid to liquid 140.

FIG. 17(B) shows the meniscus 180 at the liquid-vapor interface. In some embodiments, gaps between the plurality of microstructures 112 contained in the intermediate substrate 110 and the wicking structure 220 could be formed so that they are substantially smaller than the depth of the wicking structure 220. In some embodiments the relatively small gaps between the plurality of microstructures 112 contained in the intermediate substrate 110 and the wicking structure 220 could provide effectively higher aspect ratio wicking channels, compared to some embodiments where the wicking structure 220 is formed by wet etching a single metal substrate 210 (as is common, and depicted in FIG. 16(C)).

In some embodiments, titanium could be used as a substrate material. The thermal conductivity of titanium is approximately $k_{Ti}$=20 W/(m K), and liquid water is approximately, $k_W$=0.6 W/(m K). Since the thermal conductivity of titanium is approximately 30 times higher than liquid water, the intermediate substrate 110 can provide additional thermal conduction pathways, which can decrease the thermal resistance between the outside surface of the thermal ground plane and liquid 140 located in the wicking structure 220. Furthermore, the microstructures 112 contained within the intermediate substrate 110 could increase the solid-liquid interface area, which could decrease the thermal resistance, and increase the critical heat flux that can occur, between titanium solid and liquid 140.

In some embodiments, the combination of the wicking structure 220 and the intermediate substrate 110 can effectively increase the effective aspect ratio of the channels in the wicking structure 220. Under very large pressure differences between the liquid and vapor phases, the meniscus 180 may be pushed down and not wet the top of the wicking structure 220. However, in some embodiments, the shape of the composite wicking structure 220 formed by interleaving the microstructures 112 of the intermediate substrate 110 with the wicking structure 220 may be chosen such that under large pressure differences across the meniscus 180, there is only partial dryout (or at least dryout could be substantially delayed) of the wicking structure 220 (so that the TGP continues to function), and the thermal ground plane does not undergo catastrophic dryout.

In previous two-phase heat transfer devices, instabilities can occur due to evaporation and/or boiling as the liquid phase is converted to the vapor phase. These instabilities can cause local dryout of the wicking structure 220 and can degrade the performance of the thermal ground plane. These instabilities can be substantially decreased in some of the current embodiments. For example, in some embodiments, the shape of the wicking structure 220 formed by interleaving the microstructures 112 of the intermediate substrate 110 with the wicking structure 220 may be chosen such that there can be substantial viscous resistance to liquid flow in the wicking structure 220. This viscous resistance can be advantageous as it can increase the stability of the evaporation and/or boiling process that may occur in the evaporator.

Figure 17C:
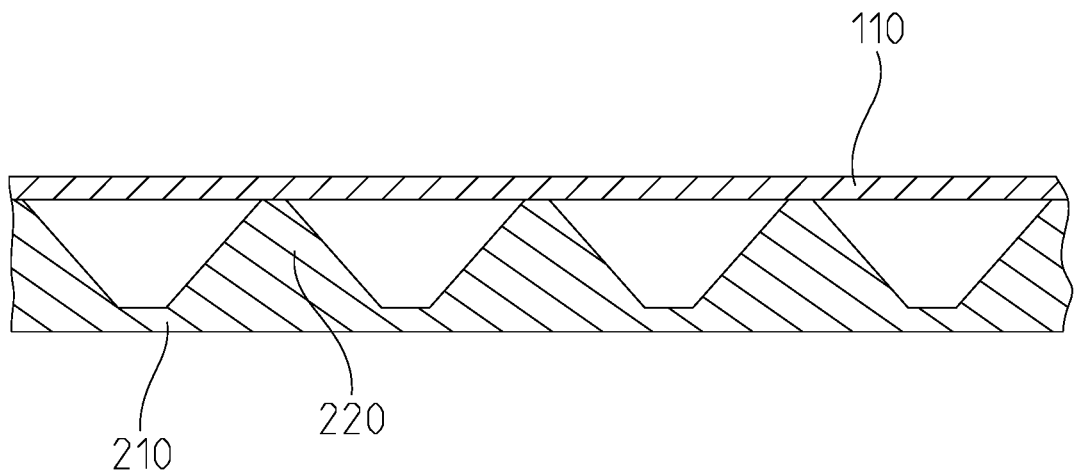

FIG. 17(C) shows a profile view an adiabatic region of an illustrative embodiment, where the intermediate substrate 110 is positioned in close proximity to the wicking structure 220. In some embodiments, the intermediate substrate 110 could be placed directly above the wicking structure 220. In some embodiments, the intermediate substrate 110 could be comprised of microstructures 112. In some embodiments, a solid intermediate substrate 110 could be used to isolate the vapor chamber 300 from the wicking structure 220. By isolating the vapor chamber 300 from the wicking structure 220, the solid-liquid interface area could be increased, and the liquid 140 could substantially fill the wicking structure 220, which could provide a higher mass flow rate of the liquid with less viscous pressure drop, compared to earlier wicking structures 220.

Figure 17D:
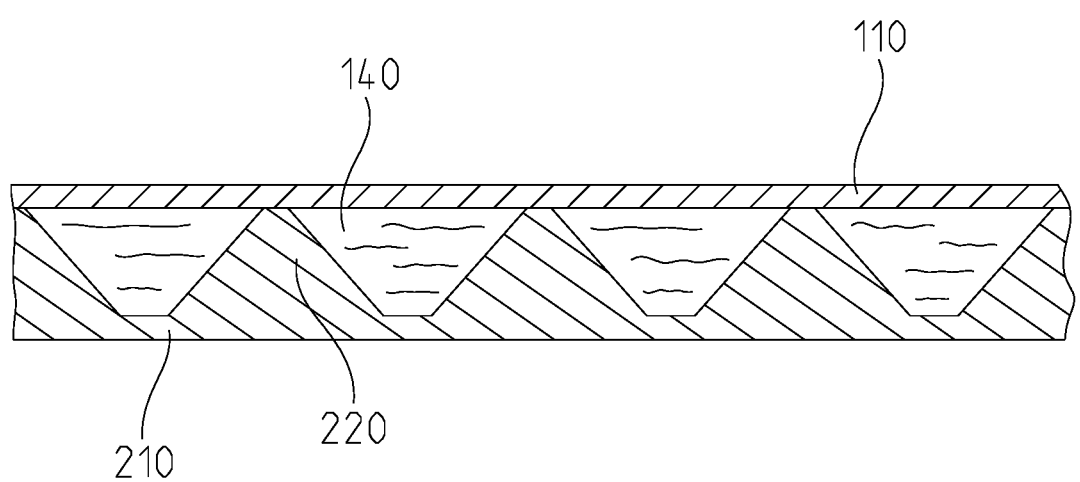

FIG. 17(D) shows a profile view an adiabatic region of an illustrative embodiment, where the intermediate substrate 110 is positioned in close proximity to the wicking, and where liquid 140 is wetted in the wicking structure 220. A solid intermediate substrate 110 could be used to isolate the vapor chamber 300 from the wicking structure 220. By isolating the vapor chamber 300 from the wicking structure 220, the solid-liquid interface area could be increased, and the liquid 140 could fill substantially the wicking structure 220, which could provide a higher mass flow rate for the liquid with less viscous pressure drop, compared to earlier wicking structures 220.

In some embodiments, where high-performance thermal energy transfer is desired, it may be important to decrease viscous losses of the liquid in the adiabatic region. In some embodiments, an intermediate substrate 110 could be used to isolate the vapor chamber 300 from the liquid 140 in the wicking structure 220. In some embodiments, where there is a large difference in pressure between the vapor and the liquid in the wicking structure 220, the vapor chamber 300 can be isolated from the liquid in the wicking structure 220 by a solid intermediate substrate 110, which could prevent the high difference in pressure from negatively affecting flow liquid in the wicking structure 220.

In earlier TGPs, wet-etched wicking channels could have low aspect ratios (i.e. low ratio between the channel height to the channel width). In some embodiments, if there is a large pressure difference between the vapor and liquid phases, the liquid phase may not completely fill the wicking channel, and the liquid 140 flow through the wicking structure 220 could be negatively impacted, and could lead the dryout of the wicking channel. In some embodiments of the current disclosure, an intermediate substrate 110 could be used to isolate the vapor chamber 300 from liquid 140 contained in the wicking structure 220, and could delay or even prevent dryout of the wicking structure 220.

Figure 17E:
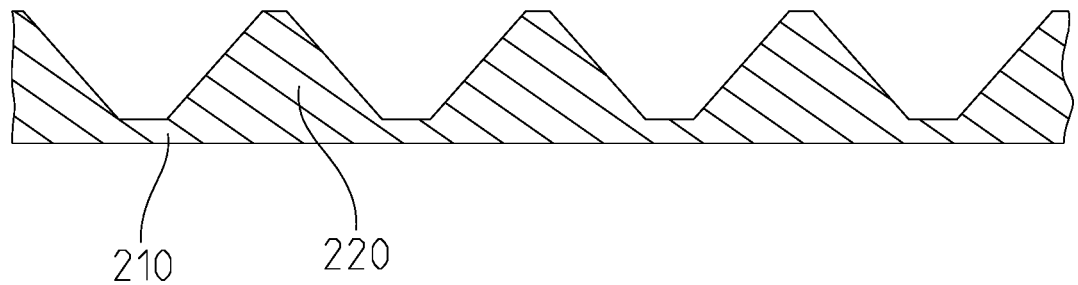

FIG. 17(E) shows a profile view of a condenser region of an illustrative embodiment, where the wicking structure 220 is in direct communication with the vapor chamber 300. When the wicking structure 220 is in direct communication with the vapor chamber 300, vapor could condense more readily onto the wicking structure 220. Furthermore, in regions, such as the condenser, there might not be significant differences in pressure between the liquid and vapor phases, and an intermediate substrate 110 may not provide significant advantages. However, for a case where the condenser region is large, significant differences in pressure between the liquid phase and the vapor phase could exist and accordingly, the condenser region could conceivably benefit from at least one intermediate substrate 110 with microstructures 112, whose effect is to increase the effective aspect ratio of the wicking structure 220, thereby shortening the meniscus 180 length and thus increasing the amount of pressure that the meniscus 180 can support, as described above for the evaporation region.

Figure 17F:
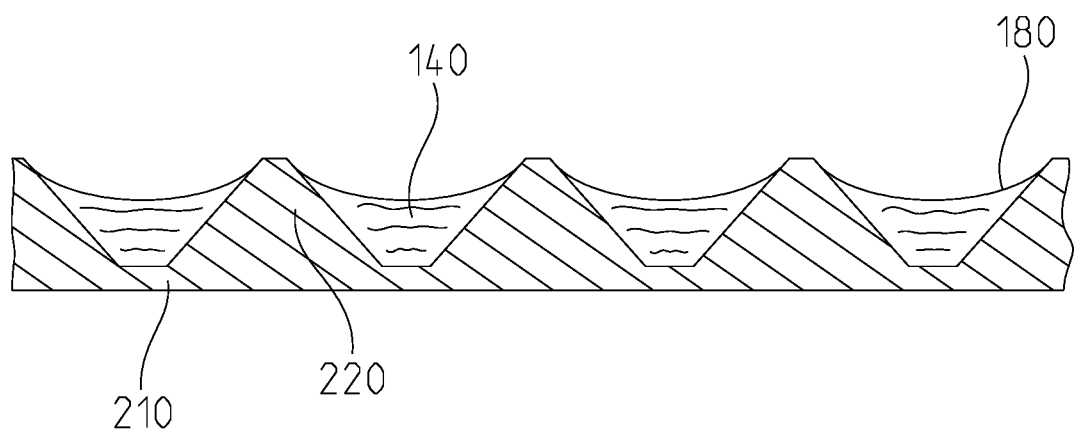

FIG. 17(F) shows a profile view of a condenser region of an illustrative embodiment, where the wicking structure 220 is in direct communication with the vapor chamber 300, where the wicking structure 220 is wetted by a liquid 140. In some embodiments, there may not be a significant difference in pressure between the vapor chamber 300 and the liquid 140 in the wicking structure 220, and an intermediate substrate 110 may not provide significant advantages. However, for a case where the condenser region is large, significant pressure difference between the liquid phase and the vapor phase could exist and accordingly, the condenser region could conceivably benefit from microstructures 112 whose effect is to increase the effective aspect ratio of the wicking structure 220 and increase the amount of pressure that the meniscus 180 can support, as described above for the evaporation region.

Figure 18:
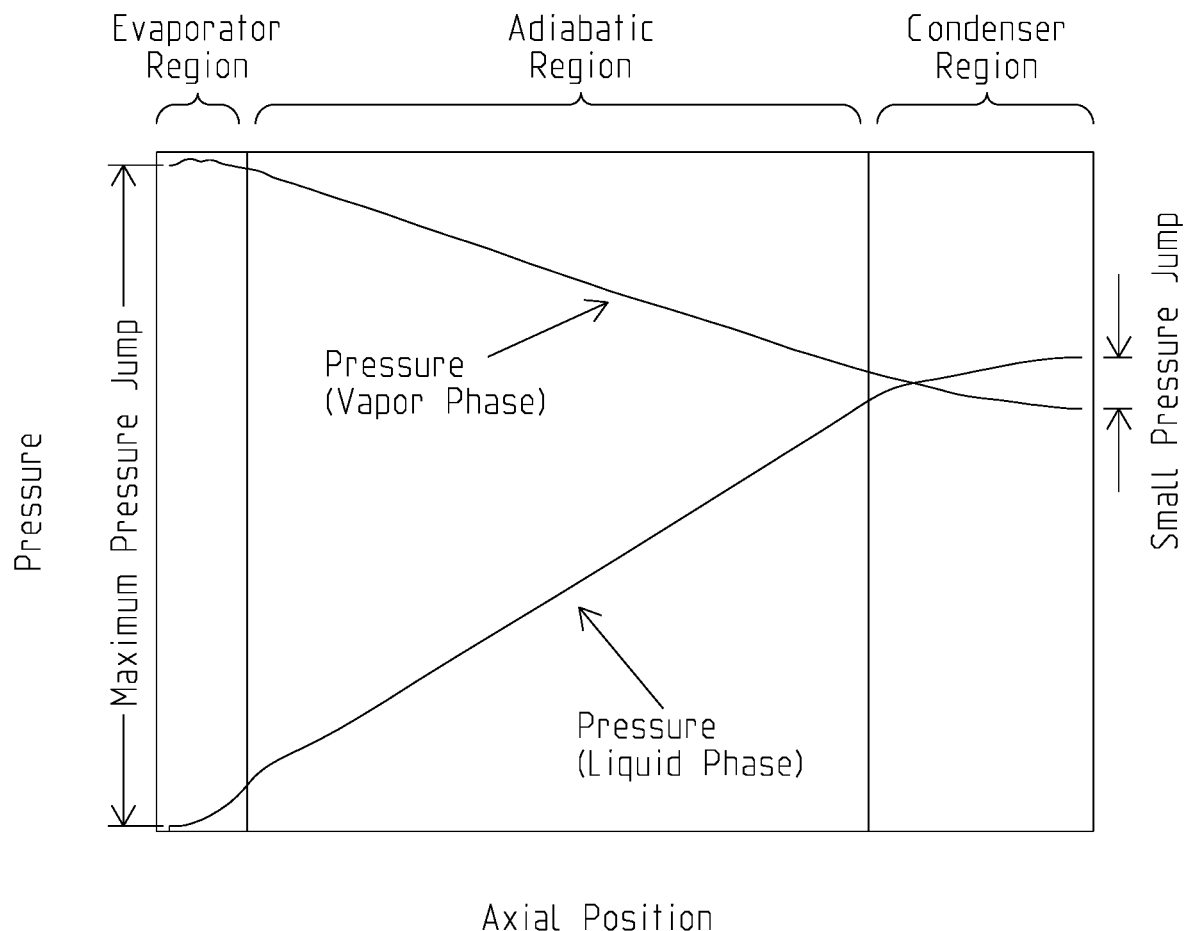
FIG. 18 shows pressure profiles as a function of axial location for an illustrative embodiment of a thermal ground plane. The curves show the pressure of the vapor phase in the vapor chamber and the liquid phase in the wicking structure. In this case, the maximum pressure difference between the liquid and vapor phases occurs in the evaporator region. The minimum pressure difference between the vapor and liquid phases occurs in the condenser region.

FIG. 18 shows pressure profiles as a function of axial location for an illustrative embodiment of a thermal ground plane. The curves show the pressure of the vapor phase in the vapor chamber 300 and the liquid phase in the wicking structure 220. In an illustrative embodiment, the maximum pressure difference between the liquid and vapor phases could occur in the evaporator region. In an illustrative embodiment, the minimum pressure difference between the vapor and liquid phases could occur in the condenser region.

Wicking structures 220 may be comprised of channels, pillars, or other structures. If these structures are formed by wet etching or other fabrication processes, they may be comprised of features with low aspect ratios. Earlier wicking structures 220 could be comprised of low effective aspect ratio channels or pillars, and did not include an intermediate structure. In these earlier low effective aspect ratio wicking structures 220, a large pressure difference between the liquid phase and the vapor phase could cause the meniscus 180 between the two phases to extend towards the bottom of the channel, thereby decreasing the amount of liquid 140 occupying the channel and significantly decreasing the mass flow of the liquid. This in turn could cause poor heat transfer performance and possible dryout of the wicking structure 220.

As shown in FIG. 18, the highest vapor pressure typically occurs in the evaporator region, and the vapor pressure, due to viscous losses, increases with the amount of heat transferred by the TGP. Further, it may be desirable to make the overall thickness of the thermal ground plane as thin as practically possible, which might be accomplished by making the vapor chamber 300 relatively thin. A relatively thin vapor chamber 300 could cause substantial viscous losses of the vapor flowing in the vapor chamber 300 from the evaporator through the adiabatic region to the condenser. High viscous losses of vapor flowing in the vapor chamber 300 can also contribute to a large difference in pressure between the liquid and vapor phases in the evaporator. An intermediate substrate 110 structure, which increases the effective aspect ratio of the wicking structure 220, as described above, has the effect of decreasing the meniscus 180 length of the liquid/vapor interface, making the radius of curvature smaller, in this part of the wicking structure 220, thereby making the meniscus 180 more resistant to high meniscus 180 pressure (FIG. 17(B)) and making the TGP capable of supporting much higher pressures than previous implementations. Accordingly, at least one region of the at least one intermediate substrate may have a plurality of microstructures that are interleaved with at least one region of the wicking structure to form high effective aspect ratio wicking structures, in at least one region of the thermal ground plane. Furthermore, at least one intermediate substrate may be in close proximity to the wicking structure, to isolate the liquid phase and vapor phase, in at least one region of the thermal ground plane.

Supporting higher pressure differences between the liquid phase and the vapor phase allows for more heat to be transferred without drying out the wicking structure 220 as well as making the TGP more resistant to viscous losses resulting from thinner designs. Thus the addition of the intermediate substrate 110 may achieve both higher heat transfer and thinner ground planes, simultaneously.

In some embodiments, the thermal ground plane could be filled with a specified mass of saturated liquid/vapor mixture such that difference in pressure between the vapor and liquid phases in the condenser is well controlled. In some embodiments the mass of the liquid/vapor mixture could be chosen so that part of the condenser region could contain liquid at a higher pressure than adjacent vapor.

Figure 19:
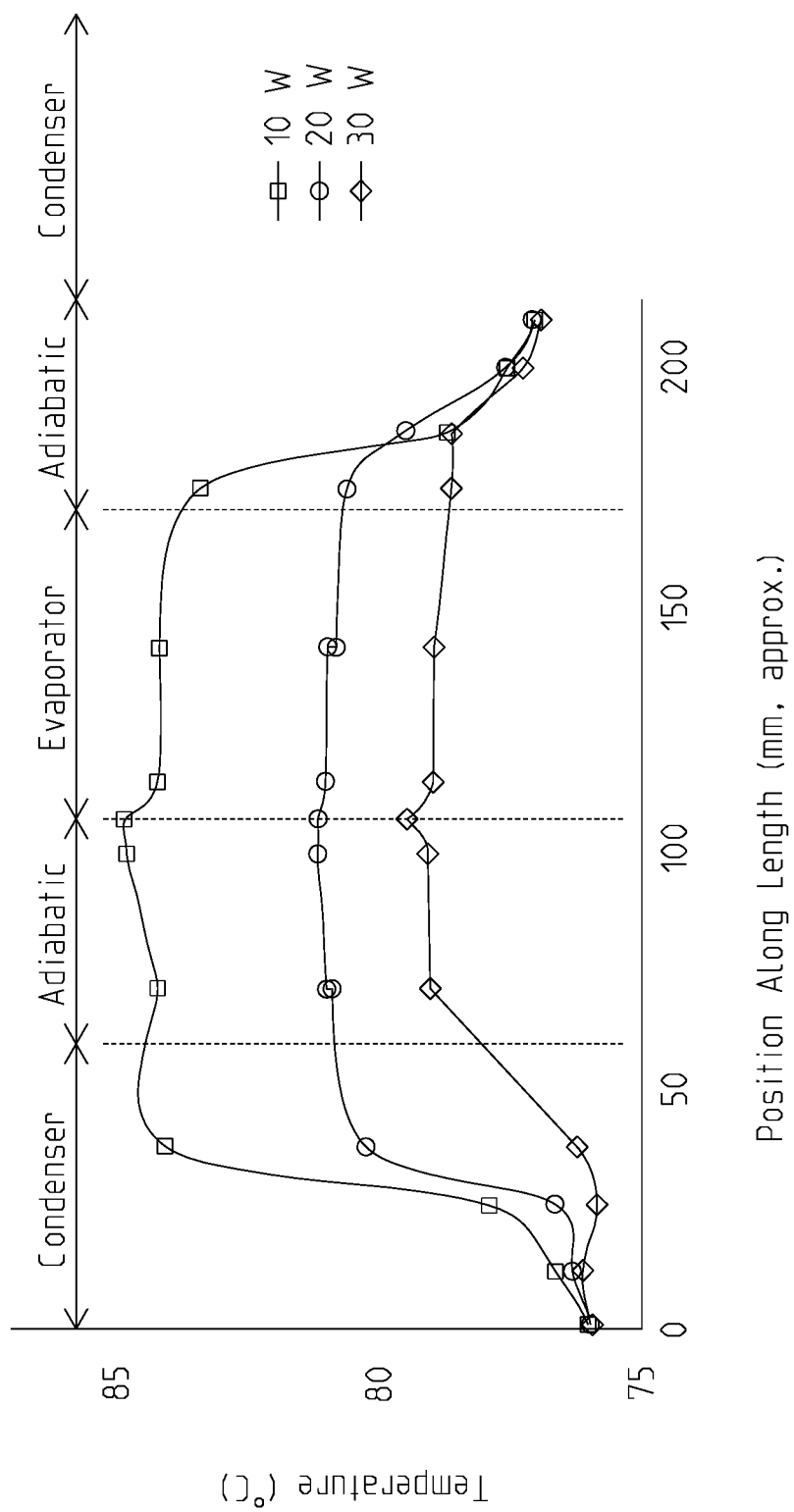
FIG. 19 shows temperature profiles as a function of axial location for an illustrative embodiment of a thermal ground plane, under heat loadings of Q=10, 20, and 30 W. In this embodiment, the evaporator is in the center, and there are adiabatic and condenser regions on each side.

FIG. 19 shows temperature profiles as a function of axial location for an illustrative embodiment of a thermal ground plane, under heat transfer rates of Q=10, 20, and 30 W. In this illustrative embodiment, the evaporator is in the center, and there are is an adiabatic and condenser region on each side. The results demonstrate the utility of an embodiment of a titanium thermal ground plane with an intermediate substrate 110.

Figure 20:
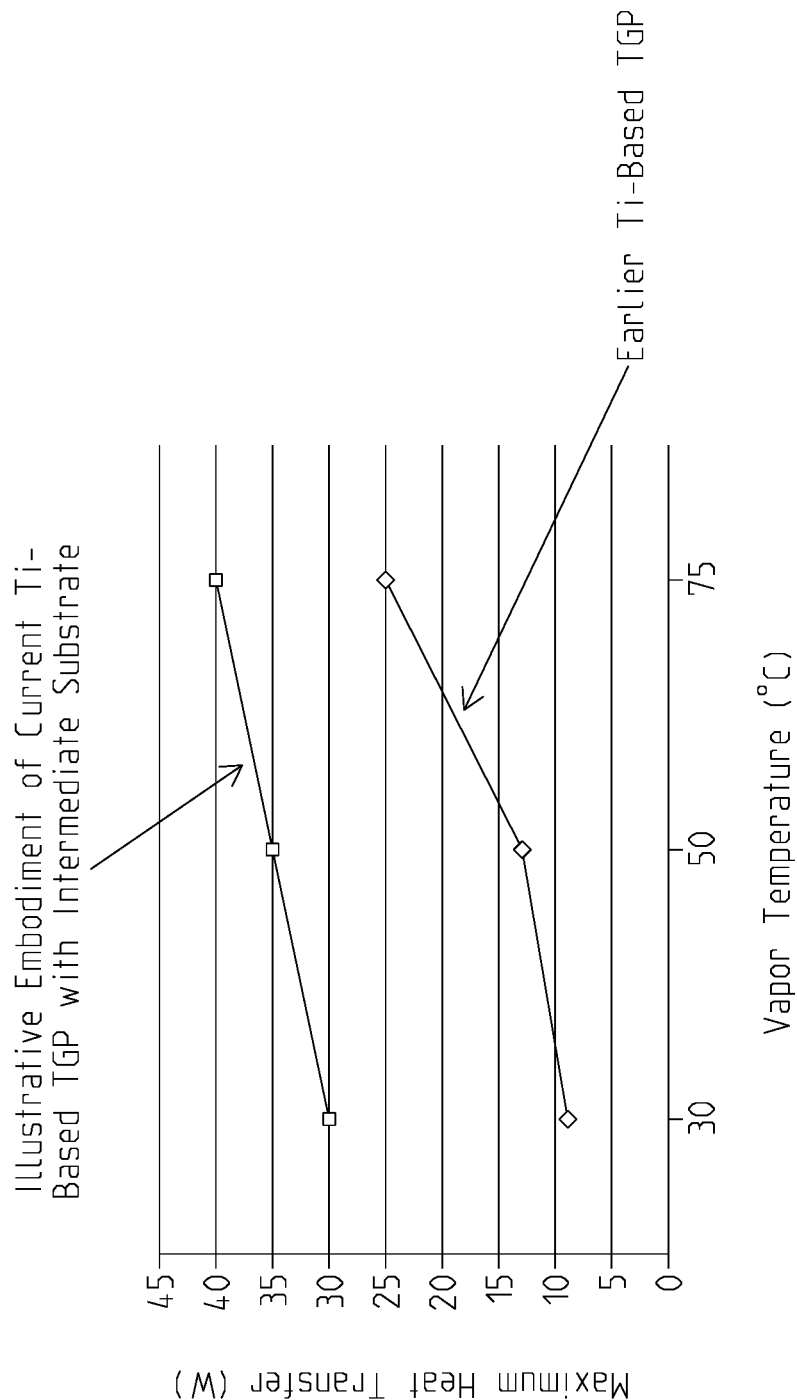
FIG. 20 compares maximum heat transfer for titanium-based thermal ground planes for different vapor temperatures. The comparison is between an earlier titanium thermal ground plane, and an illustrative embodiment of the current thermal ground plane using an intermediate substrate.

FIG. 20 compares maximum heat transfer for titanium-based thermal ground planes for different vapor temperatures. The comparison is between an earlier titanium thermal ground plane, and an illustrative embodiment of the current thermal ground plane using an intermediate substrate 110.

An earlier titanium thermal ground plane with similar dimensions to embodiments tested for FIG. 19 might only be capable of transferring about 10 W of thermal energy before the wicking structure 220 exhibits dryout at an operating vapor temperature of 30° C., compared to 30 W for an illustrative embodiment of the current thermal ground plane using an intermediate substrate 110. Similarly, as vapor temperature is increased, the maximum thermal energy transferred for an illustrative embodiment of the current thermal ground plane is increased to 35 W and 40 W, for operating vapor temperatures of 50° C. and 70° C., respectively. In all cases, the maximum thermal energy transferred for an illustrative embodiment of the current thermal ground plane is 15-20 W more than what is observed from an earlier thermal ground plane.

Figure 21:
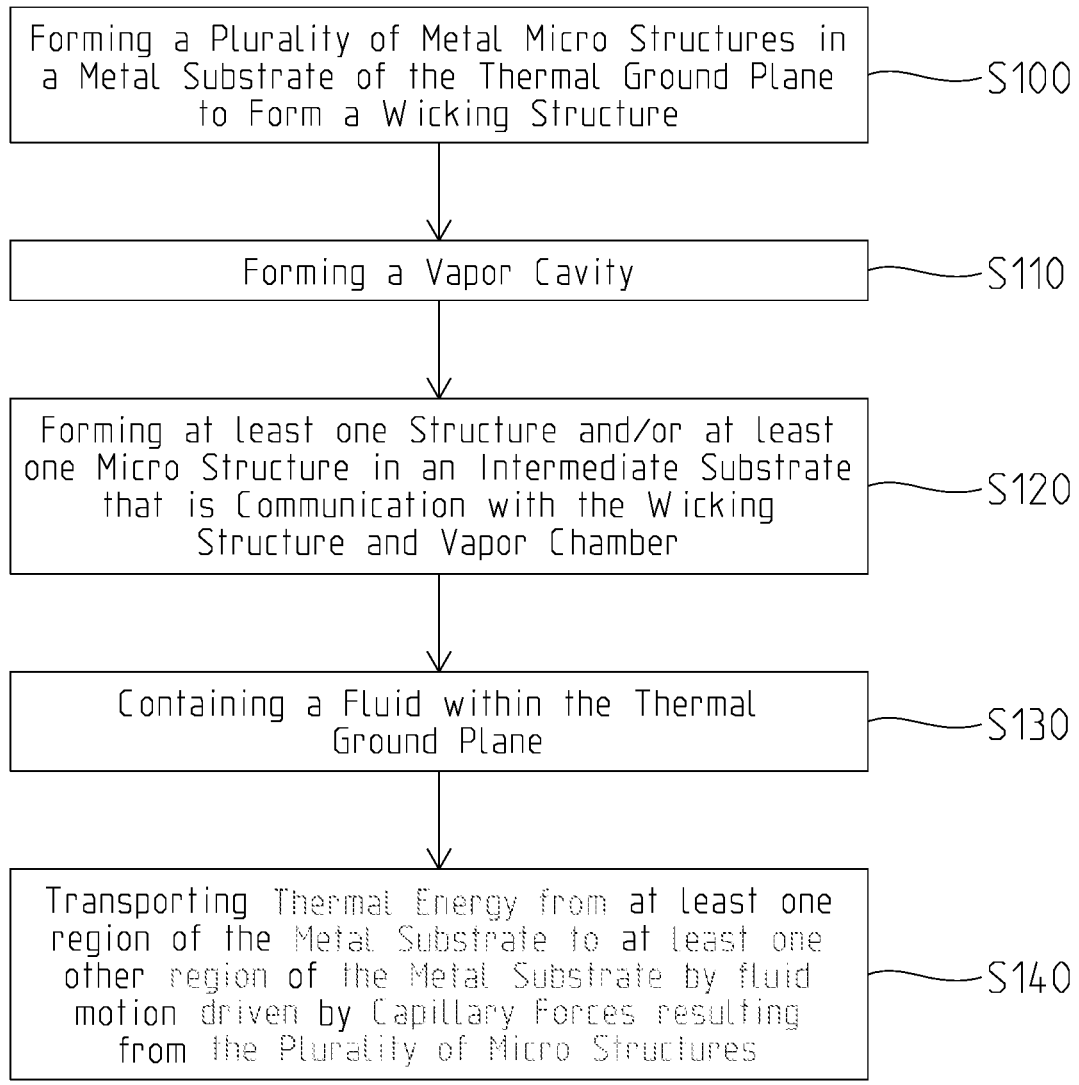
FIG. 21 is an illustrative embodiment of a flow chart of the formation of one or more embodiments of the current Ti-based TGP (metal-based Thermal Ground Plane) in accordance with one or more embodiments.

FIG. 21 illustrates a flow chart of the formation of one or more embodiments of the current Ti-based TGP in accordance with one or more embodiments of the present invention. In some embodiments, thermal energy can be transported by (1) forming a plurality of metal micro structures in a metal substrate of the thermal ground plane to form a wicking structure in step S100. In step S110, a vapor cavity may be formed. In step S120, at least one structure and/or at least one microstructure is formed in an intermediate substrate that is communication with the wicking structure and vapor chamber, wherein the intermediate substrate is shaped and positioned to increase the effective aspect ratio of the wicking structure in at least one region of the wicking structure. In step S130, a fluid may be contained within the thermal ground plane. In step S140, thermal energy may be transported from at least one region of the metal substrate to at least one other region of the metal substrate by fluid motion driven by capillary forces, resulting from the plurality of microstructures.

Figure 22:
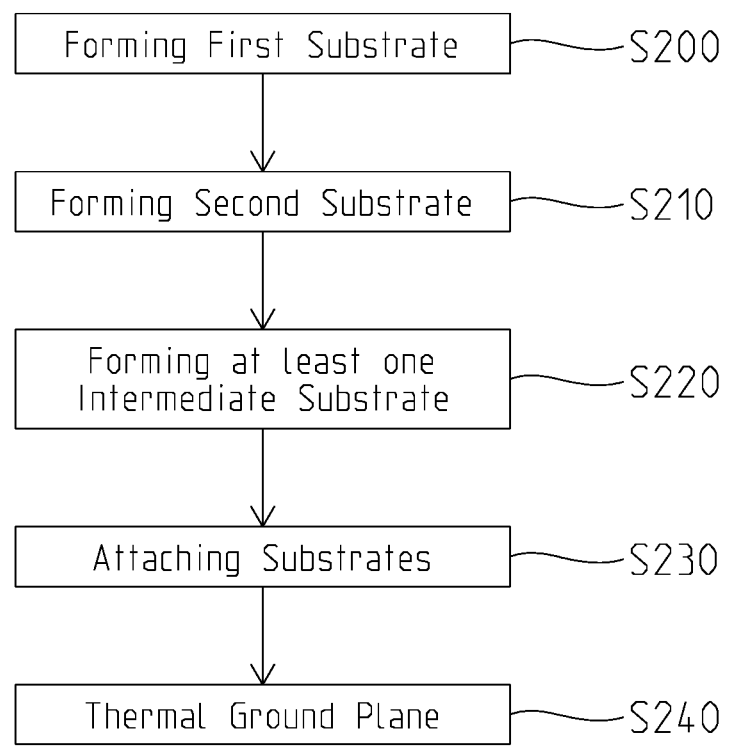
FIG. 22 is an illustrative embodiment of a flow chart of the formation of one or more embodiments of the current Ti-based TGP.

FIG. 22 illustrates a flow chart of the formation of one or more embodiments of the current Ti-based TGP in accordance with one or more embodiments of the present invention. In some embodiments a metal-based thermal ground plane can be formed by the following process. In step S200, the first substrate is formed. In step S210, a second substrate is formed. In step S220, at least one intermediate substrate is formed. In step S230, the substrates are attached. In step S240, the thermal ground plane is formed.

Figure 23A:
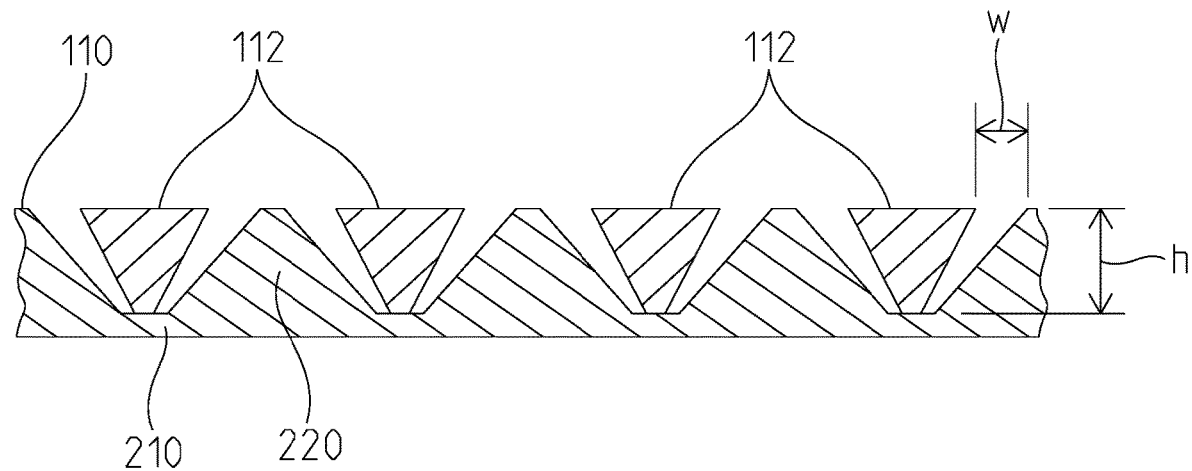
FIG. 23 shows illustrative embodiments of a wicking structure in communication with an intermediate substrate. The effective aspect ratio is defined as the ratio of the effective channel height, h, to the effective channel width, w: (A) shows an illustrative embodiment where the microstructures in the intermediate substrate are interleaved with the wicking structure, (B) shows an alternative embodiment where the microstructures in the intermediate substrate are positioned above the wicking structure.

FIG. 23 shows illustrative embodiments of a wicking structure 220 in communication with an intermediate substrate 110. The effective aspect ratio is defined as the ratio of the effective channel height, h, to the effective channel width w: (A) shows an illustrative embodiment where the microstructures 112 of the intermediate substrate 110 are interleaved with the wicking structure 220, (B) shows an alternative embodiment where the microstructures 112 of the intermediate substrate 110 are positioned above the wicking structure 220.

The illustrative embodiments shown in FIG. 23 could provide effective aspect ratios that are higher than what might be obtained by the wicking structure 220 without including an intermediate substrate 110. For example, if the wicking structure 220 is formed by a wet etching or other isotropic etching process, the effective aspect ratio h/w may be less than unity, or substantially less than unity. Using an intermediate substrate 110, higher effective aspect ratios of the fluid channel between the wicking structure 220 and the intermediate substrate 110, may be achieved. For example, in some embodiments, h/w>1 wherein h is the effective height (or depth) of the fluid channel and w is the width.

Figure 23B:
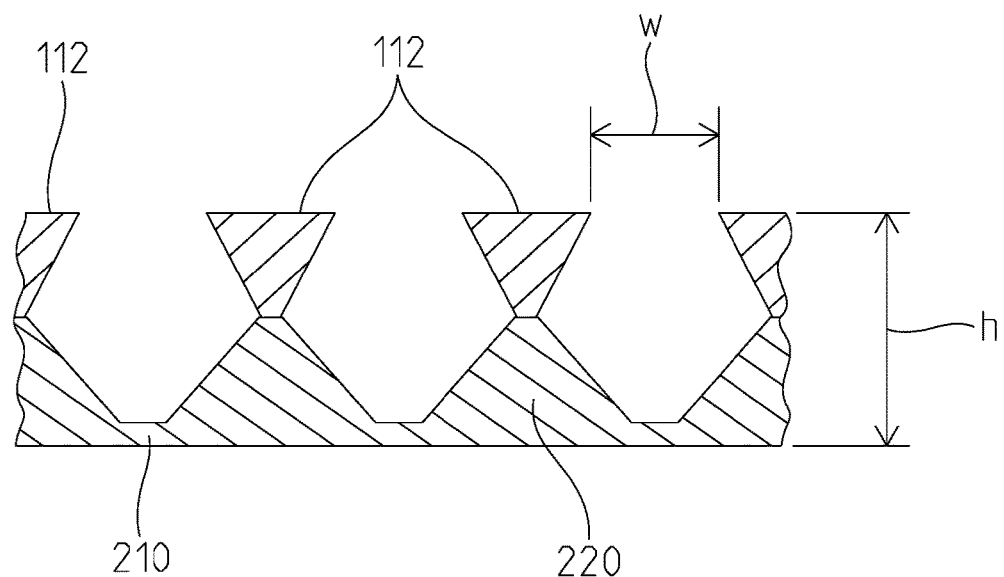
Figure 24:
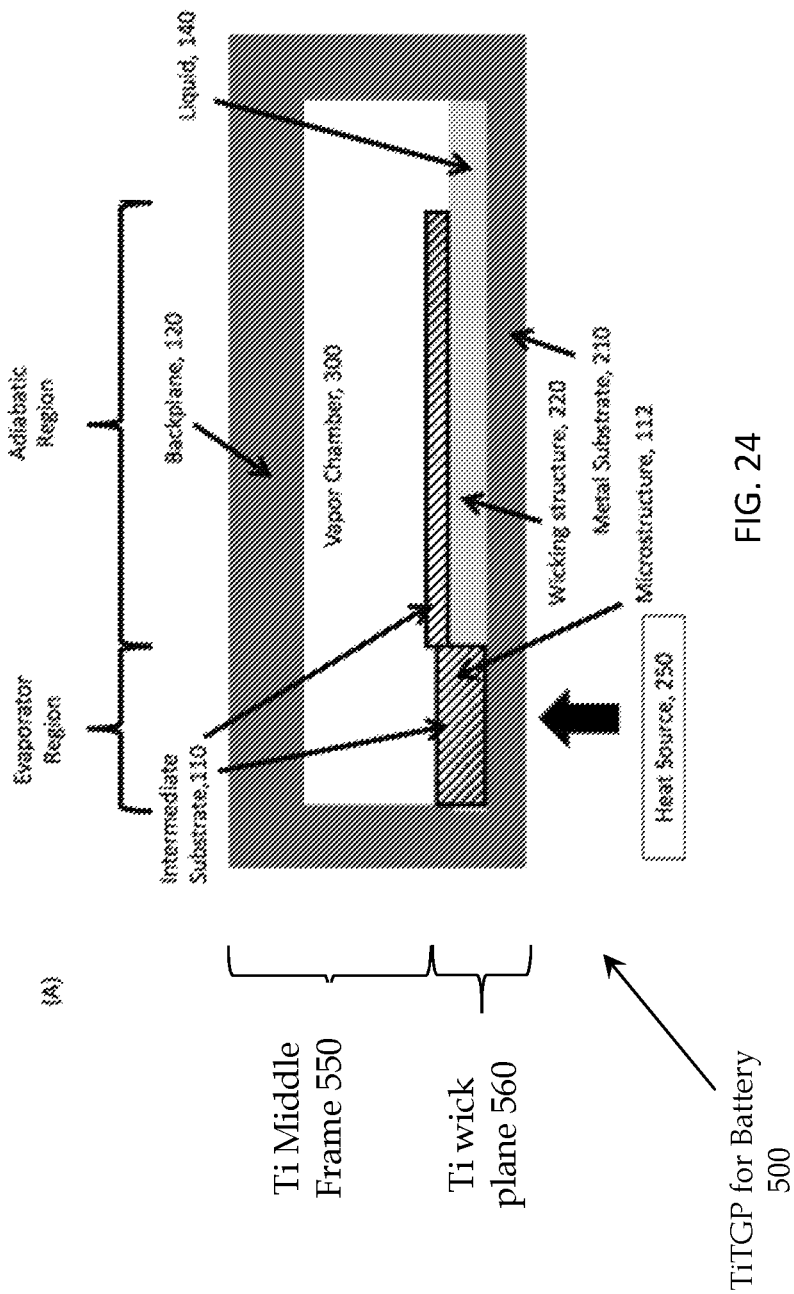
FIG. 24 is a simplified cross-sectional view of a first embodiment of the thermal ground plane, having a plurality of thermal ground planes, adapted for use in a battery application.

FIG. 23(B) shows an alternative embodiment, which could have advantages when relatively low viscous losses are desirable.

FIG. 14 shows a profile view an illustrative embodiment where a vapor chamber can be comprised of one or more recessed regions 540, 542 and 544. Viscous flow of vapor in the vapor chamber can be described by Poiseuille flow, where for a given pressure drop, density and viscosity, the mass flow rate of vapor scales with the cube of the vapor chamber height $\sim h^3$. For very thin vapor chambers, viscous losses can be substantial and limit the overall performance of the thermal ground plane. In some embodiments, vapor chambers 300 can be configured with one or more recessed regions 540, thereby increasing the effective height of the vapor chamber, h, in chosen regions of the thermal ground plane. Since the mass flow rate of vapor can vary with $h^3$, increasing the height of the vapor chamber in chosen regions can substantially increase the mass flow rate of vapor through the chamber, for a given pressure drop.

In some embodiments, the one or more recessed regions 544 can be formed in the metal substrate and located adjacent to the wicking structure. In some embodiments, the one or more recessed regions 540 and 542 can be formed in the backplane 530. In some embodiments, the one or more recessed regions can be formed in a combination of the metal substrate and backplane. In some embodiments, recessed regions can be configured to be in communication with other recessed regions, in order to minimize viscous losses in the vapor chamber. In some embodiments, recessed region 540 could be aligned with recessed region 544, so that the overall depth of the vapor chamber in that region is increased by the combination of recessed region 540 and recessed region 544. Vapor mass flow rate can vary with the vapor chamber height cubed, $\sim h^3$. Therefore, the combination of recessed region 540 and recessed region 544 can have a non-linear effect on reducing viscous losses, and thereby increase overall mass flow rate.

The TiTGP shown in FIG. 14 may be in thermal communication with at least one structural element of the battery. These structural elements are the components that give the portable device most of its strength and stiffness, and may form the skeleton of the device, and may include at least the middle frame 550 and the wick surface 560. The surfaces of the TiTGP may also be structural elements, including the backplane 120 and the metal substrate 210. These structural members are generally metallic, and may include, for example, the backplane 120, the middle frame 550 and the metal substrate 210. More preferably, the TiTGP comprises titanium with a laser weld sealing the back. As a result, the surface of this structural member which is coupled to the battery may be substantially isothermal, with a temperature gradient of less than about 10 C. This may provide effective heat dissipation and optimize battery performance and lifetime.

Discussion now turns to the fabrication of the TiTCPs for the portable applications. The wicking structures, and outer shell of the thermal modules 500, 600 and 700 may be made by stamping the shapes from a metal material. The smaller microstructures may be made by microstamping. Alternatively, the contours and cavities may be made by chemical etching using, for example, hydrofluoric acid (HF) and nitric acid ((HNO3). As is known in the art, portions of the titanium material can be protected from the etchant by a coating or masking layer. All exposed surfaces may then be etched to form the grooves, cavities and smaller structures.

The TiTGP may be provided with a quantity of working fluid using, for example, the method described in Ser. No. 14/749,439 filed Jun. 24, 2015, and incorporated by reference. The working fluid may be, for example, water, and the sealing methodology used to enclose the working fluid in the vapor cavity may be laser welding.

Accordingly, disclosed here is a battery comprising metal anode having a plurality of microfabricated raised features. The microfabricated raised features may have an aspect ratio height/diameter of at least 1 and a pitch of between 1 and 50 microns. A low resistivity metal coating may be disposed over the metal anode which is conformal to the metal anode and the microfabricated raised features. A metal oxide layer of a second metal may then be disposed over the metal coating, wherein the metal oxide layer of the second metal may have a microfabricated microroughness of at least 1 nm rms. The microfabricate raised features may comprise at least one of pillars, posts, trenches, channels and tetrahedral protrusions. In some embodiments, the raised features may comprise pillars between 0.5-10 microns in diameter, wherein the pillars stand between 10 and 50 microns proud of the remaining surface, such that the pillars have an aspect ratio of at least 1. In other embodiments, the raised features may comprise pillars 1-2 μm in diameter and 10-12 μm in height, with a center-to-center pitch of 1.5 to 2.5 μm, such that the anode surface area is increased by a factor of at least 2. In yet other embodiments, the pillars may be 5 microns in diameter, and stand 20 microns proud of the remaining surface, with an aspect ratio is at least 10. The raised features may occur in a regularly-spaced array over a surface of the metal anode.

The metal anode may comprise titanium and the metal oxide layer coating may comprise $TiO_2$. The metal coating may comprises at least one of gold, silver, platinum, copper and aluminum, with a resistivity of less than 1 ohm-meter. In other embodiments, the a titanium alloy may be used, such that the oxide layer may comprise an oxide of the titanium metal alloy. The metal oxide layer has a microroughness of between about 1-1000 nm rms. In some embodiments, the metal oxide layer may have a microroughness of about 200 nm rms.

The battery may also include a cathode, and an electrolyte between the cathode and the anode, wherein the cathode comprises a layered lithium transition metal compound. The cathode may comprise lithium, and the battery may further include an electrolyte and a separator between the metal anode and the lithium-based cathode, wherein the separator is disposed within the electrolyte, and wherein the metal anode comprises titanium. These components may all be disposed within a packaging structure comprising titanium. This packaging structure may be hermetically sealed.

The battery may have an overall thickness of at least 0.2 mm. The battery may have a lateral dimension of less than about 10 mm. The battery may have a specific energy density of at least about 600 W-hr/kg. The anode, cathode and electrolyte may be sealed in a titanium housing. The battery may have a thickness of less than about 0.5 mm, allowing the battery to be flexible, and thus to fit in a confined space having irregular dimensions. The cathode may comprise a layered $Li_2MnO_3^+/LiMnO_2$ structure, and the electrolyte is 1 M $LiPF_6$ in 50/50 mix of ethylene carbonate and diethyl carbonate. The electrolyte comprises a solid state electrolyte.

The metal oxide layer over the metal anode may further comprise a microroughness formed of oxidized titanium and having an rms roughness of at least 1 nm. The metal oxide layer may comprise a titanium-based oxide overcoat, disposed over the metal coating, wherein the titanium-based oxide overcoat further comprises a microroughness formed of oxidized titanium. The metal coating may have a thickness of less than 10 microns. The metal coating may comprise at least one of gold, silver, copper, platinum and aluminum. The metal oxide layer may comprise nanostructured titanium.

A power source is also disclosed, which includes the MEMS anode battery described above. Along with the MEMS anode battery, the power source may further comprise a titanium-based two-phase thermal module in thermal communication with the battery. The titanium-based two-phase thermal module may further include a metal substrate comprising a plurality of microstructures formed in the metal substrate, forming a wicking structure having the plurality of microstructures, a vapor cavity, in communication with the wicking structure and the plurality of microstructures, at least one intermediate substrate with a plurality of protrusions, wherein the plurality of protrusions is shaped to increase the effective aspect ratio of the wicking structure by fitting into the plurality of microstructures of the wicking structure in at least one region of the wicking structure, and a fluid contained within the thermal ground plane for transporting thermal energy from at least one region of the thermal ground plane to another region of the thermal ground plane, wherein the fluid is driven by capillary forces.

Within the thermal module, the plurality of microstructures may have a characteristic dimension of 1-1000 microns. The thermal module may further include a metal backplane, wherein the vapor cavity is enclosed by the metal substrate and the metal backplane. The metal substrate may be hermetically bonded to the metal backplane to form a hermetically-sealed vapor cavity.

The power source may further include a resistive load electrically coupled between the metal anode and the cathode of the battery. It may also include a second power source coupled to the battery, wherein the second power source provides a charging current to the battery.

A method for fabricating a battery is also disclosed. The method may include providing a metal anode, etching a plurality of microfabricated raised features into the metal anode, wherein the microfabricated raised metal features have an aspect ratio of at least about 1 and a pitch of between 1-50 microns, and depositing a metal coating conformally over the metal anode and the plurality of microfabricated raised features. The method may further include depositing a layer of a second metal over the metal coating, and oxidizing the layer of the second metal to form a layer of metal oxide having a microfabricated microroughness in the layer of metal oxide of at least 1 nm rms.

The layer of the second metal may comprise a layer of titanium, and the metal oxide comprises titanium dioxide, such that the microroughness is formed in the titanium dioxide as nanostructured titanium (NST). The metal coating may have a thickness of less than 10 microns, and comprises at least one of gold, silver, copper, platinum and aluminum.

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. Accordingly, the exemplary implementations set forth above, are intended to be illustrative, not limiting.

What is claimed is:

1. A method for fabricating a battery, comprising:
   providing a metal anode;
   etching a plurality of microfabricated raised features into the metal anode, wherein the microfabricated raised metal features have an aspect ratio of at least 1 and a pitch of between 1-50 microns; and
   depositing a metal coating of a second metal conformally over the metal anode and the plurality of microfabricated raised features;
   depositing another layer of a metal over the metal coating, and oxidizing the layer of metal to form a layer of metal oxide having a microfabricated microroughness in the layer of metal oxide of at least 1 nm rms wherein the layer of metal comprises a layer of titanium, and the metal oxide comprises titanium dioxide, such that the microroughness is formed in the titanium dioxide as nanostructured titanium (NST).

2. A method for fabricating a battery, comprising:
   providing a metal anode;
   etching a plurality of microfabricated raised features into the metal anode, wherein the microfabricated raised metal features have an aspect ratio of at least 1 and a pitch of between 1-50 microns; and
   depositing a metal coating of a second metal conformally over the metal anode and the plurality of microfabricated raised features wherein the metal coating of the second metal has a thickness of less than 10 microns, and comprises at least one of gold, silver, copper, platinum and aluminum:
   depositing another layer of a metal over the metal coating, and oxidizing the layer of metal to form a layer of metal oxide having a microfabricated microroughness in the layer of metal oxide of at least 1 nm rms.

3. A battery comprising:
a metal anode made of a first metal having a plurality of microfabricated raised features, wherein the microfabricated raised features have an aspect ratio height/diameter of at least 1;
a metal coating of a second metal that is dissimilar to said first metal, said coating is conformal to the metal anode and the microfabricated raised features;
a second metal coating conformally covers said anode and said second metal, said second metal coating then being oxidized to form a metal oxide covering said second metal and said oxidized second metal coating in direct contact with said second metal wherein the metal oxide layer has a microfabricated microroughness of at least 1 nm rms.

* * * * *